US011999177B2

(12) United States Patent
Kanda et al.

(10) Patent No.: US 11,999,177 B2
(45) Date of Patent: Jun. 4, 2024

(54) PRINTING APPARATUS, PRINTING METHOD, AND STORAGE MEDIUM

(71) Applicant: CANON KABUSHIKI KAISHA, Tokyo (JP)

(72) Inventors: Hidehiko Kanda, Kanagawa (JP); Takayuki Ushiyama, Chiba (KE); Takeshi Yazawa, Kanagawa (JP); Keiji Kuriyama, Saitama (JP); Akihiro Tomida, Kanagawa (JP); Yoshinori Nakajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 177 days.

(21) Appl. No.: 17/852,608

(22) Filed: Jun. 29, 2022

(65) Prior Publication Data

US 2023/0001721 A1 Jan. 5, 2023

(30) Foreign Application Priority Data

Jun. 30, 2021 (JP) ................................. 2021-109356

(51) Int. Cl.
*B41J 29/393* (2006.01)

(52) U.S. Cl.
CPC .................................. *B41J 29/393* (2013.01)

(58) Field of Classification Search
CPC . B41J 29/393; B41J 2/2114; B41J 2029/3935
See application file for complete search history.

(56) References Cited

U.S. PATENT DOCUMENTS

| | | | |
|---|---|---|---|
| 5,825,377 | A | 10/1998 | Gotoh et al. |
| 5,949,447 | A | 9/1999 | Arai et al. |
| 5,980,012 | A | 11/1999 | Fujita et al. |
| 6,027,196 | A | 2/2000 | Gotoh et al. |
| 6,109,720 | A | 8/2000 | Gotoh et al. |
| 6,113,210 | A | 9/2000 | Gotoh et al. |
| 6,120,129 | A | 9/2000 | Iwasaki et al. |
| 6,142,600 | A | 11/2000 | Takahashi et al. |
| 6,145,950 | A | 11/2000 | Ohtsuka et al. |
| 6,244,681 | B1 | 6/2001 | Yano et al. |
| 6,260,938 | B1 | 7/2001 | Ohtsuka et al. |

(Continued)

FOREIGN PATENT DOCUMENTS

| | | |
|---|---|---|
| JP | 2001-138494 A | 5/2001 |

*Primary Examiner* — Julian D Huffman
(74) *Attorney, Agent, or Firm* — Venable LLP

(57) ABSTRACT

A technique capable of obtaining the displacement amount of the ejection position of a reaction liquid without changing a test pattern according to the configuration of the ejection head is to be provided. A test pattern including a detection pattern, which extends in a predetermined direction and in which, if divided into two, at least two inks and the reaction liquid are ejected to one area and only the at least two inks or the at least two inks and the reaction liquid of an amount that is smaller than that of the reaction liquid ejected to the one area are ejected to the other area, is printed, and the optical characteristics of the printed detection pattern are obtained. Further, based on the obtained optical characteristics of the detection pattern, the displacement amount of the ejection position of the reaction liquid in the predetermined direction is obtained.

20 Claims, 19 Drawing Sheets

(56) References Cited

U.S. PATENT DOCUMENTS

| | | | | |
|---|---|---|---|---|
| 6,371,609 | B1 * | 4/2002 | Oikawa | B41J 2/04586 347/41 |
| 6,435,639 | B1 | 8/2002 | Nakajima et al. | |
| 6,543,872 | B2 | 4/2003 | Ohtsuka et al. | |
| 6,543,892 | B2 | 4/2003 | Kubota et al. | |
| 6,601,938 | B1 | 8/2003 | Iwasaki et al. | |
| 6,631,972 | B2 | 10/2003 | Yazawa | |
| 6,712,443 | B2 | 3/2004 | Kanda et al. | |
| 6,764,154 | B2 | 7/2004 | Nishikori et al. | |
| 6,857,718 | B2 | 2/2005 | Moriyama et al. | |
| 6,877,833 | B2 | 4/2005 | Teshigawara et al. | |
| 6,913,337 | B2 | 7/2005 | Kuronuma et al. | |
| 6,921,218 | B2 | 7/2005 | Moriyama et al. | |
| 6,945,623 | B2 | 9/2005 | Sakamoto et al. | |
| 6,957,879 | B2 | 10/2005 | Moriyama et al. | |
| 6,966,629 | B2 | 11/2005 | Nakajima et al. | |
| 6,991,316 | B2 | 1/2006 | Maru et al. | |
| 7,052,191 | B2 | 5/2006 | Moriyama et al. | |
| 7,080,892 | B2 | 7/2006 | Moriyama et al. | |
| 7,090,332 | B2 | 8/2006 | Konno et al. | |
| 7,101,004 | B2 | 9/2006 | Sakamoto et al. | |
| 7,144,093 | B2 | 12/2006 | Nakajima et al. | |
| 7,185,964 | B2 | 3/2007 | Kanda et al. | |
| 7,258,412 | B2 | 8/2007 | Maru et al. | |
| 7,261,387 | B2 | 8/2007 | Nishikori et al. | |
| 7,287,830 | B2 | 10/2007 | Ide et al. | |
| 7,290,855 | B2 | 11/2007 | Chikuma et al. | |
| 7,296,872 | B2 | 11/2007 | Hayashi et al. | |
| 7,296,877 | B2 | 11/2007 | Chikuma et al. | |
| 7,303,247 | B2 | 12/2007 | Maru et al. | |
| 7,315,393 | B2 | 1/2008 | Kanda et al. | |
| 7,325,900 | B2 | 2/2008 | Hayashi et al. | |
| 7,328,963 | B2 | 2/2008 | Tajika et al. | |
| 7,344,219 | B2 | 3/2008 | Sakamoto et al. | |
| 7,354,133 | B2 | 4/2008 | Ide et al. | |
| 7,408,676 | B2 | 8/2008 | Yazawa et al. | |
| 7,515,318 | B2 | 4/2009 | Nishikori et al. | |
| 7,533,962 | B2 | 5/2009 | Masuyama et al. | |
| 7,537,310 | B2 | 5/2009 | Konno et al. | |
| 7,651,194 | B2 | 1/2010 | Yazawa et al. | |
| 7,706,023 | B2 | 4/2010 | Kanda et al. | |
| 7,758,153 | B2 | 7/2010 | Tanaka et al. | |
| 7,762,640 | B2 | 7/2010 | Kanda et al. | |
| 7,782,350 | B2 | 8/2010 | Tanaka et al. | |
| 7,789,476 | B2 | 9/2010 | Tomida et al. | |
| 7,850,273 | B2 | 12/2010 | Yasutani et al. | |
| 7,862,149 | B2 | 1/2011 | Yasutani et al. | |
| 7,903,280 | B2 | 3/2011 | Yazawa et al. | |
| 7,980,649 | B2 | 7/2011 | Konno et al. | |
| 7,980,652 | B2 | 7/2011 | Baba et al. | |
| 7,980,672 | B2 | 7/2011 | Umezawa et al. | |
| 8,038,253 | B2 | 10/2011 | Ide et al. | |
| 8,057,009 | B2 | 11/2011 | Tomida et al. | |
| 8,079,659 | B2 | 12/2011 | Tajika et al. | |
| 8,164,789 | B2 | 4/2012 | Nishikori et al. | |
| 8,186,783 | B2 | 5/2012 | Yasutani et al. | |
| 8,251,473 | B2 | 8/2012 | Moriyama et al. | |
| 8,251,479 | B2 | 8/2012 | Seki et al. | |
| 8,251,480 | B2 | 8/2012 | Moriyama et al. | |
| 8,251,482 | B1 | 8/2012 | Yasutani et al. | |
| 8,342,649 | B2 | 1/2013 | Yazawa et al. | |
| 8,384,944 | B2 | 2/2013 | Kawatoko et al. | |
| 8,439,472 | B2 | 5/2013 | Yasutani et al. | |
| 8,511,779 | B2 | 8/2013 | Yasutani et al. | |
| 8,511,787 | B2 | 8/2013 | Yasutani et al. | |
| 8,517,490 | B2 | 8/2013 | Kanematsu et al. | |
| 8,579,401 | B2 | 11/2013 | Iritani et al. | |
| 8,608,277 | B2 | 12/2013 | Tomida et al. | |
| 8,622,501 | B2 | 1/2014 | Komamiya et al. | |
| 8,636,334 | B2 | 1/2014 | Nishioka et al. | |
| 8,721,021 | B2 | 5/2014 | Nakajima et al. | |
| 8,786,896 | B2 | 7/2014 | Marumoto et al. | |
| 8,882,228 | B2 | 11/2014 | Ojiro et al. | |
| 8,888,223 | B2 | 11/2014 | Oonuki et al. | |
| 8,939,540 | B2 | 1/2015 | Fletcher et al. | |
| 9,007,653 | B2 | 4/2015 | Ojiro et al. | |
| 9,010,896 | B2 | 4/2015 | Tomida | |
| 9,120,304 | B2 | 9/2015 | Konno et al. | |
| 9,126,403 | B2 | 9/2015 | Ojiro et al. | |
| 9,211,748 | B2 | 12/2015 | Baba et al. | |
| 9,227,423 | B2 | 1/2016 | Yazawa et al. | |
| 9,545,791 | B2 | 1/2017 | Oonuki et al. | |
| 9,573,381 | B2 | 2/2017 | Kanda et al. | |
| 10,668,717 | B2 | 6/2020 | Azuma et al. | |
| 11,077,687 | B2 | 8/2021 | Nishioka et al. | |
| 11,383,536 | B2 | 7/2022 | Genta et al. | |
| 2009/0079777 | A1 | 3/2009 | Nagamura et al. | |
| 2009/0244120 | A1 * | 10/2009 | Yamazaki | B41J 29/393 347/14 |
| 2009/0244149 | A1 * | 10/2009 | Yamazaki | B41J 2/2114 347/14 |
| 2014/0375717 | A1 | 12/2014 | Yazawa et al. | |
| 2022/0001666 | A1 | 1/2022 | Kuriyama et al. | |
| 2022/0080747 | A1 | 3/2022 | Kato et al. | |
| 2022/0379642 | A1 * | 12/2022 | Ushiyama | B41J 2/2114 |

* cited by examiner

FIG.11A
FIG.11B
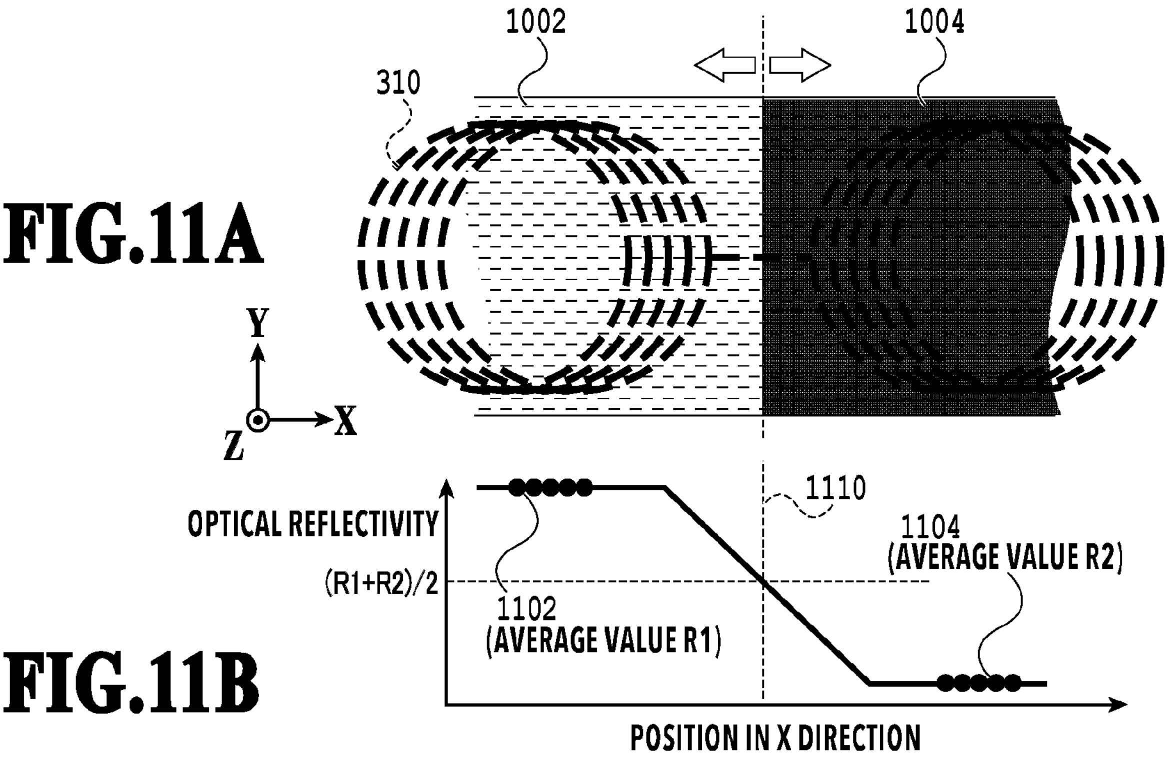
FIG.11C
FIG.11D
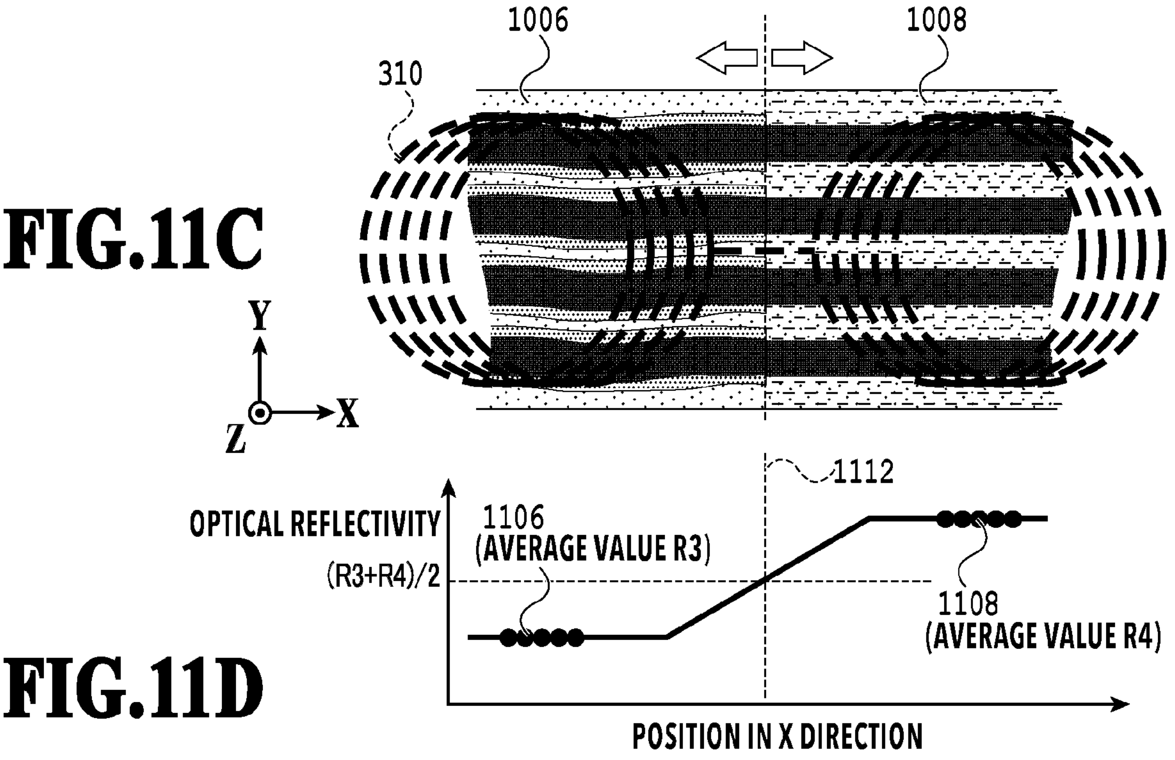

PRINTING APPARATUS, PRINTING METHOD, AND STORAGE MEDIUM

BACKGROUND OF THE INVENTION

Field of the Invention

The present invention relates to a printing apparatus, a printing method, and a storage medium for printing with fixation of ink to a print medium by use of a reaction liquid that reacts with the ink.

Description of the Related Art

Japanese Patent Laid-Open No. 2001-138494 discloses a technique in which, for ejected ink, a printing apparatus that ejects a reaction liquid that reacts with the ink obtains the displacement amount of the ejection position of the reaction liquid relative to the ejection position of the ink. In the technique disclosed in this Japanese Patent Laid-Open No. 2001-138494, as test patterns for obtaining the above-mentioned displacement amount, multiple patterns having different displacement amounts of the ejection position of the reaction liquid are used for patterns in which bleeding occurs if two inks are brought into contact on the print medium.

By the way, in a printing apparatus that ejects a reaction liquid together with ink, in order to suppress the reaction liquid and the ink from contacting each other in the apparatus, the ejection head in which the ejection ports for ejecting the reaction liquid are formed and the ejection head in which the ejection ports for ejecting the ink are formed are configured separately, for example. Further, these ejection heads are arranged so as to be distant from each other. In this case, as compared with an integrated ejection head in which the ejection ports for ejecting the reaction liquid and the ejection ports for ejecting the ink are formed, the position accuracy between the ejection ports for the reaction liquid and the ejection ports for the ink is reduced due to the manufacturing tolerance or the like. In consideration of such position accuracy, for the test patterns for obtaining the above-described displacement amount, it was necessary to increase the patterns having different displacement amounts of the ejection position of the reaction liquid for the ejection amounts of ink.

SUMMARY OF THE INVENTION

The present invention has been made in view of the above-described problem and provides a technique capable of obtaining the displacement amount of the ejection position of the reaction liquid without changing the test pattern according to the configuration of the ejection head.

In the first aspect of the present invention, there is provided a printing apparatus including:

a printing unit configured to perform printing by ejecting a plurality of inks, whose materials are different from each other, and a reaction liquid, which reacts with the inks so as to prompt solidification of the inks, to a print medium;

a measurement unit configured to be capable of measuring an optical characteristic of a print product;

a control unit configured to control the printing unit to use at least two inks of the plurality of inks and the reaction liquid and print a test pattern in which bleeding is made to occur between the at least two inks and configured to control the measurement unit to measure an optical characteristic of the printed test pattern; and an obtainment unit configured to obtain a displacement amount of an ejection position of the reaction liquid, based on the optical characteristic of the test pattern measured by the measurement unit, wherein the test pattern includes a detection pattern extending in a predetermined direction, and the detection pattern divided into two in the predetermined direction includes one area, in which the at least two inks and the reaction liquid are ejected, and the other area, in which only the at least two inks or the at least two inks and the reaction liquid of an amount that is smaller than that of the reaction liquid ejected to the one area are ejected, and wherein the obtainment unit obtains the displacement amount in the predetermined direction, based on an optical characteristic of the detection pattern.

In the second aspect of the present invention, there is provided a printing method of a printing apparatus that performs printing by ejecting a plurality of inks, whose materials are different from each other, and a reaction liquid, which reacts with the inks so as to prompt solidification of the inks, to a print medium, the printing method including;

a printing step for printing a test pattern, which includes a detection pattern extending in a predetermined direction, wherein the detection pattern divided into two in the predetermined direction includes one area, in which the at least two inks and the reaction liquid are ejected, and the other area, in which only the at least two inks or the at least two inks and the reaction liquid of an amount that is smaller than that of the reaction liquid ejected to the one area are ejected;

a measurement step for measuring an optical characteristic of the test pattern printed in the printing step;

an obtainment step for obtaining a displacement amount of an ejection position of the reaction liquid in the predetermined direction, based on the optical characteristic of the test pattern measured in the measurement step; and a printing step for performing printing with correction of the displacement amount obtained in the obtainment step.

In the third aspect of the present invention, there is provided a non-transitory computer readable storage medium storing a program for causing a computer to function as a control apparatus that controls a printing apparatus, the control apparatus including:

a printing unit configured to perform printing by ejecting a plurality of inks, which are different from each other, and a reaction liquid, which reacts with the inks so as to prompt solidification of the inks, to a print medium; and a measurement unit configured to be capable of measuring an optical characteristic of a print product, wherein the printing unit is controlled to print a test pattern, which includes a detection pattern extending in a predetermined direction, and the detection pattern divided into two in the predetermined direction includes one area, in which the at least two inks and the reaction liquid are ejected, and the other area, in which only the at least two inks or the at least two inks and the reaction liquid of an amount that is smaller than that of the reaction liquid ejected to the one area are ejected, wherein the measurement unit is controlled to measure an optical characteristic of the printed detection pattern, and wherein the displacement amount of an ejection position of the reaction liquid in the predetermined direction is obtained, based on the optical characteristic of the detection pattern.

According to the present invention, it is possible to obtain the displacement amount of the ejection position of the reaction liquid without changing the test pattern according to the configuration of the ejection head.

Further features of the present invention will become apparent from the following description of exemplary embodiments with reference to the attached drawings.

BRIEF DESCRIPTION OF THE DRAWINGS

FIG. 11A to FIG. 11D are diagrams for explaining a method of obtaining optical characteristics of two detection patterns;

DESCRIPTION OF THE EMBODIMENTS

Hereinafter, with reference to the accompanying drawings, detailed explanations will be given of examples of an embodiment of a printing apparatus, a printing method, and a storage medium. Note that the following embodiments are not intended to limit the present invention, and every combination of the characteristics explained in the embodiments is not necessarily essential to the solutions in the present invention. Further, the relative positions, shapes, etc., of the configurations described in the embodiments are merely examples and are not intended to limit the present invention to the range of the examples.

In the following explanation, a printing apparatus using an inkjet printing method will be described as an example. The printing apparatus may be, for example, a Single Function Printer having a printing function only or a Multi-Function Printer having multiple functions such as a printing function, a fax function, and a scanner function. Alternatively, the printing apparatus may be a manufacturing apparatus for manufacturing a color filter, an electronic device, an optical device, a microstructure, or the like by a predetermined printing method.

Further, "printing" indicates not only the cases of forming significant information such as characters and figures, that is, being meaningful or meaningless does not matter. Further, whether or not being elicited in such a manner that a human can visually perceive does not matter either, and the cases of processing a medium or forming an image, a design, a pattern, a structure, or the like on a print medium in a broad sense are also included. The "print medium" includes not only paper used in a general printing apparatus but also a cloth, plastic film, metal plate, glass, ceramics, resin, wood, leather, and the like that can accept ink.

First Embodiment

First, with reference to FIG. 1 through FIG. 11D, an explanation will be given of the printing apparatus according to the first embodiment. The printing apparatus according to the present embodiment is what is termed as an inkjet printing apparatus of a serial-scan type, which ejects ink to a conveyed print medium in an inkjet system while moving in a direction intersecting the conveyance direction.

<Configuration of the Printing Apparatus>

Figure 1:
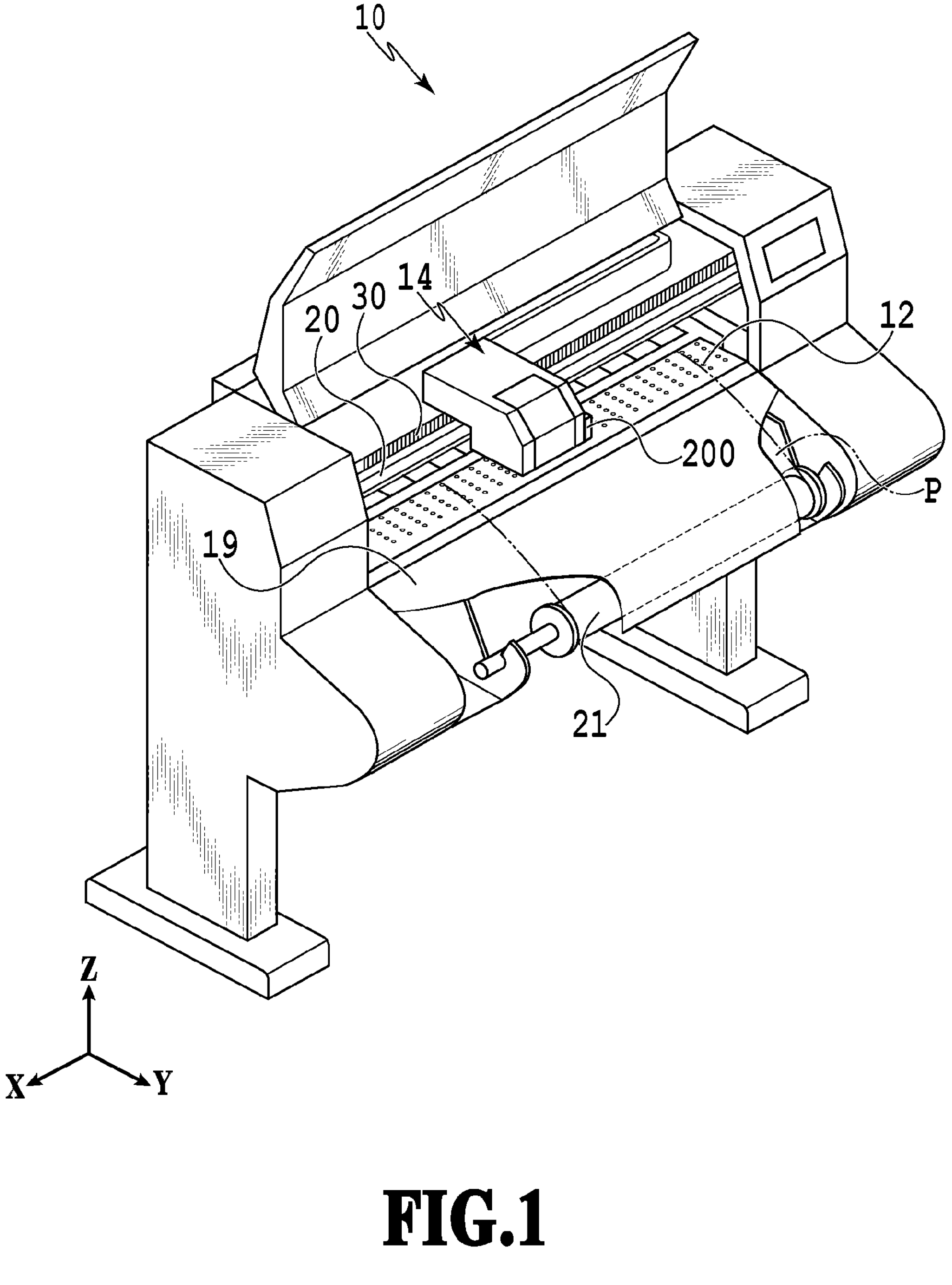
FIG. 1 is a schematic configuration diagram of a printing apparatus according to an embodiment.
Figure 2:
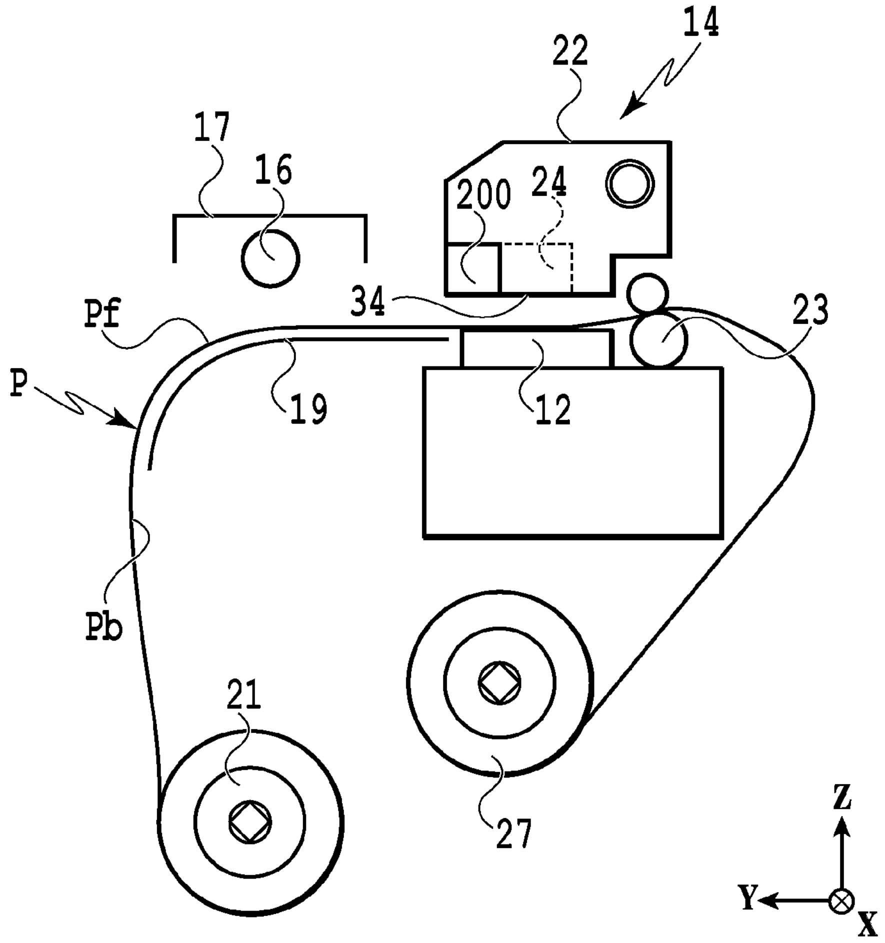
FIG. 2 is a schematic configuration diagram of a main part of the printing apparatus of FIG. 1.

FIG. 1 is a schematic configuration diagram of a printing apparatus according to an embodiment. FIG. 2 is a diagram for explaining a heat application part in the printing apparatus. The printing apparatus 10 of FIG. 1 includes the platen 12, which supports the print medium P conveyed by a conveyance part (not illustrated in the drawings), and the printing part 14, which performs printing on the print medium P that is supported by the platen 12. Further, the printing apparatus 10 includes the heat application part 16 (see FIG. 2), which applies heat to the printing surface Pf of the print medium P after printing. Note that the entire operation of the printing apparatus 10 is controlled by the control part 100 (which will be described later). Note that, in the present specification, unless otherwise specified, it is assumed that the print medium P exhibits high brightness such as white.

The conveyance part conveys the sheet-shaped print medium P that is unwound from the roll paper 27 and fed by the conveyance roller 23, which is driven via gears by the conveyance motor 540 (see FIG. 5), to the platen 12 (see FIG. 2). The print medium P after printing is wound up by the spool 21. The conveyance mechanism of the conveyance part is not limited as such, and various publicly-known techniques can be used.

The printing part 14 includes the carriage 22, which is installed on the guide shaft 20 in a movable manner, and the head unit 24, which is configured to be detachably mounted on the carriage 22 to eject ink to the print medium P that is supported by the platen 12. The guide shaft 20 extends in the X direction that intersects the Y direction (orthogonally in the present embodiment) in which the print medium P is conveyed. Accordingly, the carriage 22 is configured to be able to reciprocate in the +X direction and the −X direction along the guide shaft 20 with driving of the scanning motor 536 (see FIG. 5). The head unit 24 includes the multiple ejection ports 32 (which will be described later) for ejecting ink and is mounted on the carriage 22 so that the ejection port surface 34 (see FIG. 2) on which the ejection ports 32 are formed faces the platen 12. Accordingly, in the printing apparatus 10, the head unit 24 is configured to be capable of ejecting ink while reciprocating in the ±X direction. As for the specific movement mechanism of the carriage 22, various publicly-known techniques such as a mechanism using a carriage belt or a lead screw for transmitting a driving force from a carriage motor can be used.

Note that the printing apparatus 10 is equipped with the linear encoder 30 which extends in the X direction, so that the position of the head unit 24 is controlled by the control part 100, based on signals of the linear encoder 30. Further, the head unit 24 has a configuration capable of ejecting ink, which contains a color material, and a reaction liquid, which reacts with ink to promote thickening and solidification of the ink. In the present specification, ink containing a color material is appropriately referred to simply as ink or color ink. In the present embodiment, it is assumed that the color inks ejected from the head unit 24 are black ink (K ink), cyan ink (C ink), magenta ink (M ink), and yellow ink (Y ink). The inks of these four colors are pigment inks, which contain a color material exhibiting the corresponding color. Note that the colors and number of inks to be ejected are not limited to the above-described four colors.

In the printing apparatus 10, the printing part 14, that is, the head unit 24, moves at a speed of, for example, 40 to 45 inches/sec and performs printing at a resolution of 1200 dpi (1/1200 inches). If printing is started, the printing apparatus 10 moves the head unit 24 to the printing start position and conveys the print medium P with the conveyance part to a position where printing can be performed with the head unit 24. Next, based on print data, a printing operation of ejecting ink while moving (scanning with) the head unit 24 in the +X direction (or −X direction) is performed, and, if the printing operation is completed, a conveyance operation of conveying the print medium P by a predetermined amount with the conveyance part is performed. Thereafter, the printing operation of ejecting ink while moving the head unit 24 in the −X direction (or +X direction) is performed. In this way, the printing apparatus 10 performs printing on the print medium P by alternately and repeatedly executing the printing operation and the conveyance operation. Note that it is assumed that multipath printing, in which printing is performed by scanning with the printing part 14 multiple times for a unit area on a print medium, is executed in the present embodiment, for example.

The heat application part 16 irradiates heat to the printing surface Pf of the print medium P on which ink (and a reaction liquid) has been ejected from the printing part 14 for printing, so as to apply heat to the printing surface Pf and the ink applied to the printing surface Pf in order to fix the ink to the printing surface Pf. The heat application part 16 is covered with the cover 17, and the cover 17 has a function of efficiently reflecting the heat of the heat application part 16 onto the print medium P and a function of protecting the heat application part 16. As the heat application part 16, various kinds of heaters such as a sheathed heater and a halogen heater can be used, for example. Not only such a noncontact type heat conduction heater, it is also possible that the heat application part 16 is configured to apply heat with warm air.

The heat application part 16 is not limited to such a configuration of applying heat to the print medium P from the printing surface Pf as in FIG. 2. For example, it is also possible that the heat application part 16 is installed on the lower side of the vertical direction (upstream side in the +Z direction) relative to the guide part 19, which is located on the downstream side in the +Y direction relative to the platen 12 to guide the print medium P after printing, and applies heat to the print medium P from the back surface Pb. Further, the temperature of the heat application by the heat application part 16 is set in consideration of the fixability of the ink, the productivity of the products, etc. Further, it is also possible to install multiple heat application parts 16.

Although the details will be described later, the ink used in the printing apparatus 10 contains a pigment, resin fine particles, and a water-soluble organic solvent. Therefore, in the printing apparatus 10, the heat application part 16 applies heat to the resin fine particles contained in the ink to melt the resin fine particles, and, further, the water-soluble organic solvent in the ink is evaporated, in order to fix the pigment to the print medium. The ink containing the resin fine particles has a characteristic of improving scratch resistance (fixability). Therefore, it is desirable that the temperature of the heat application is equal to or higher than the minimum film forming temperature of the resin fine particles, and it is necessary to evaporate most of the liquid components such as the water-soluble organic solvent in the ink during the heat application. Therefore, the heat application part 16 is configured to have a temperature distribution in the print medium conveyance direction that is enough to secure a heat-application time period for supplying the energy required for evaporation of most of the liquid components.

Further, the printing apparatus 10 includes the recovery part 542 (see FIG. 5) for favorably maintaining and recovering the ejection state of the ink and the reaction liquid from the ejection ports 32 of the head unit 24. This recovery part 542 is installed adjacent to the platen 12 in the vicinity of the end part of the head unit 24 in the scanning direction (movement direction). As the recovery part 542, a publicly-known configuration such as a wiping part that wipes the ejection port surface 34 and a cap that protects the ejection port surface 34 can be used, for example.

Further, in the printing apparatus 10, the reflection type optical sensor 200 (hereinafter referred to as "optical sensor" as appropriate) for measuring the optical characteristics of the print product resulted from printing on the print medium is included on the upstream side of the +X direction relative to the carriage 22 (see FIG. 2). In the printing apparatus 10, the control part 100 is capable of measuring the reflection optical characteristics on the print medium P, based on the result detected by this optical sensor 200. Specific optical characteristics include reflection optical density using reflectivity, transmittance optical density using transmittance, optical reflectivity, reflected light strength, etc. In the present embodiment, it is assumed that optical reflectivity is measured as an optical characteristic. Note that the installation position of the optical sensor 200 is not limited as such. That is, the optical sensor 200 may be installed on the downstream side of the +X direction or on the downstream side of the +Y direction relative to the carriage 22. Alternatively, the optical sensor 200 may be installed so as to be independent from the carriage 22 and configured to be movable in the X direction or configured to extend in the X direction across the width of the print medium.

<Optical Sensor>

Figure 3B:
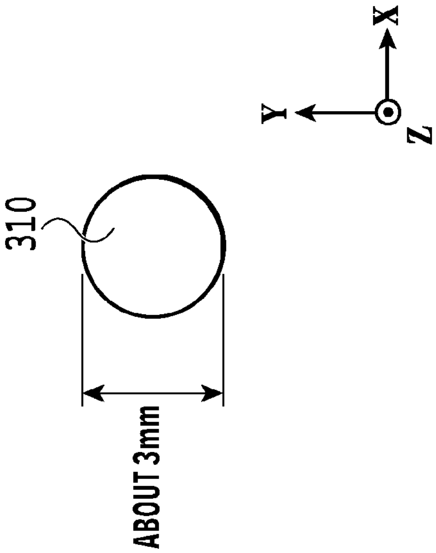
FIG. 3A and FIG. 3B are schematic configuration diagrams of an optical sensor.
Figure 3A:
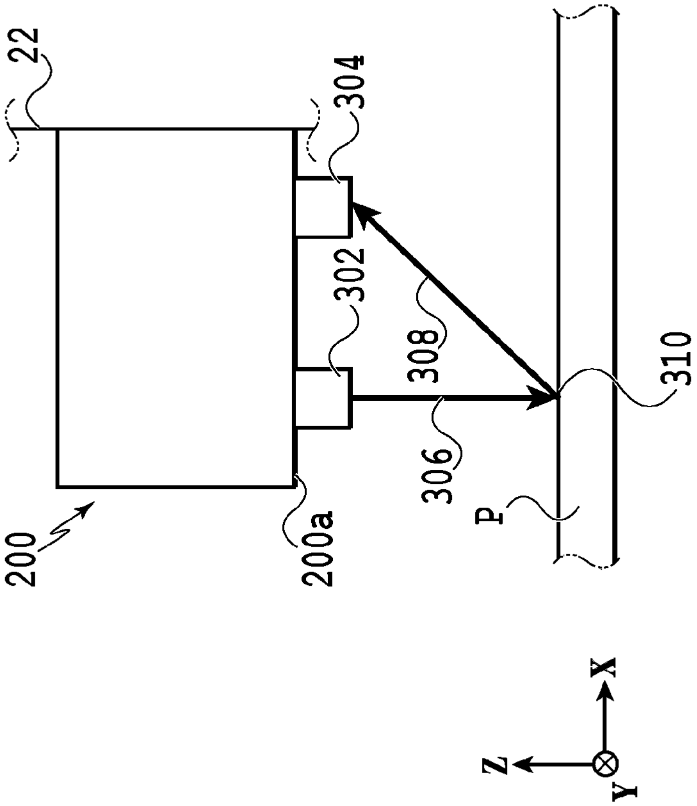

FIG. 3A is a schematic configuration diagram of the optical sensor, and FIG. 3B is a diagram illustrating a detection spot which indicates the detection range of the optical sensor of FIG. 3A. The optical sensor 200 is fixedly installed on the carriage 22 so that the measurement area is located on the downstream side of the +Y direction relative to the ejection port arrays 46 (which will be described later) of the head unit 24 with respect to the Y direction (see FIG.

6). The lower surface 200*a* of the optical sensor 200 matches the ejection port surface 34 with respect to the Z direction or is located on the downstream side of the +Z direction relative to the ejection port surface 34.

The optical sensor 200 includes the light-emitting part 302, which is implemented with visible LEDs of red, green, and blue colors, etc., and the light-receiving part 304, which is implemented with a photodiode. The light-emitting part 302 and the light-receiving part 304 are installed on the lower surface 200*a* of the optical sensor 200. Further, the light-emitting part 302 irradiates the print medium P with light, and the light-receiving part 304 receives the reflected light 308, which is reflected by the print medium P. Therefore, in the optical sensor 200, the light 306 of the irradiation from the light-emitting part 302 is diffusely reflected by the print medium P, and this reflected light 308 is received by the light-receiving part 304. The detection spot 310 in which the light 306 of the irradiation from the light-emitting part 302 is diffusely reflected by the print medium P is approximately 3 mm in diameter, for example.

In the light-receiving part 304, the detected signals (analog signal) of the received reflected light 308 are transmitted to a control circuit on an electric substrate of the printing apparatus 10 via a flexible cable (not illustrated in the drawings) or the like, so as to be converted into digital signals by an A/D converter in the control circuit. In detection of the optical characteristics of the later-described test pattern, the conveyance of the print medium P in the Y direction and the movement of the carriage 22, to which the optical sensor 200 is attached, in the X direction are alternately performed. Accordingly, the optical sensor 200 synchronizes with the timing based on the position signals (encoder signal values) obtained by the encoder 30, in order to detect the optical reflectivity of the printing result (hereinafter also referred to as "print product"), which is printed on the print medium P.

<Structure of the Head Unit>

Figure 4:
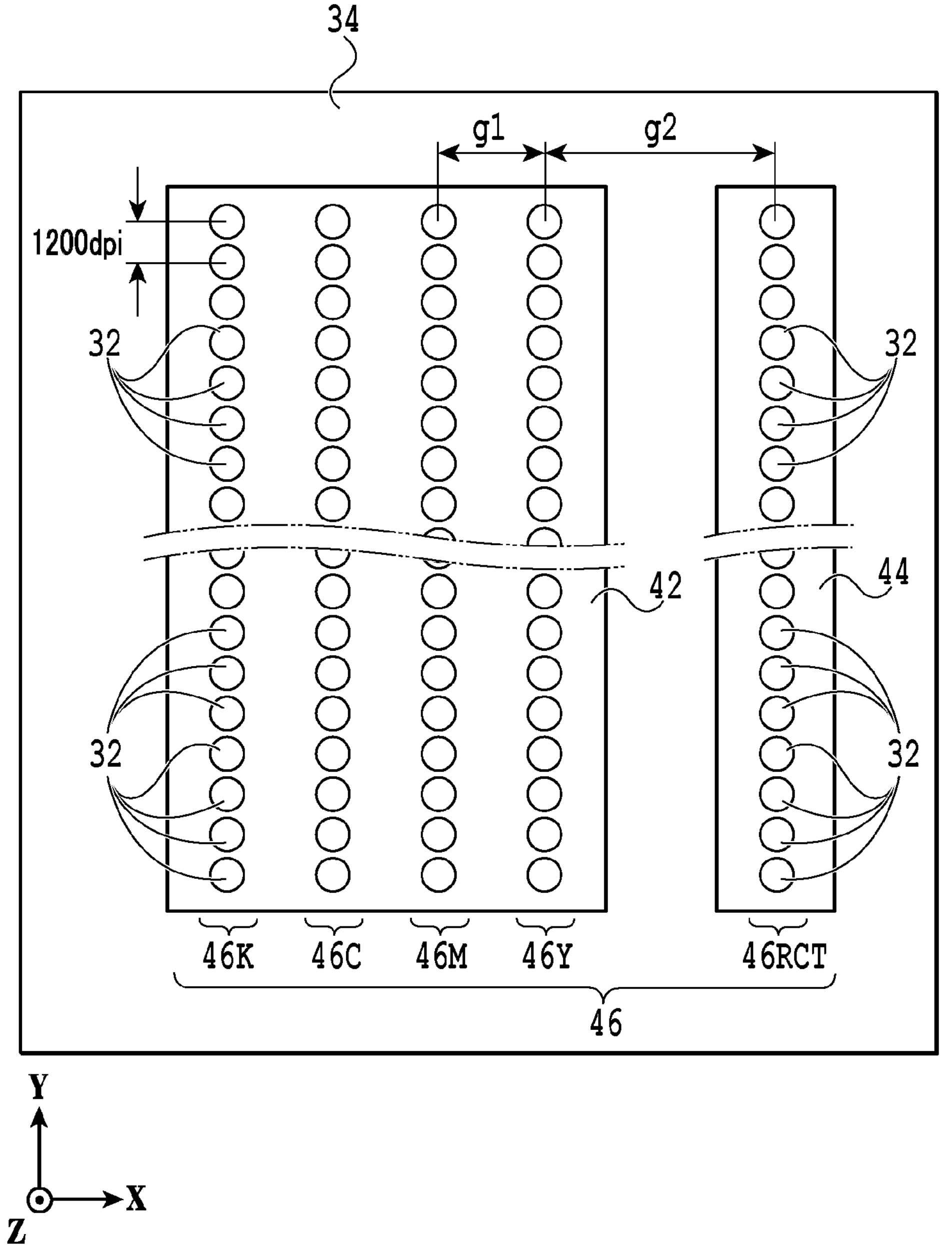
FIG. 4 is a diagram illustrating an ink ejection port surface of a head unit.

Next, the configuration of the head unit 24 will be explained. FIG. 4 is a diagram illustrating an ejection head which is installed on the ejection port surface of the head unit. Note that FIG. 4 is a diagram of the ejection port surface 34 viewed in the —Z direction.

On the ejection port surface 34 of the head unit 24, the ejection head 42 for ejecting ink and the ejection head 44 for ejecting a reaction liquid are formed separately. The ejection head 42 and the ejection head 44 respectively include the ejection port arrays 46 in which the ejection ports 32 for ejecting the corresponding ink or reaction liquid are formed along the Y direction. In order in the +X direction, the ejection head 42 is equipped with the ejection port array 46K for ejecting K ink, the ejection port array 46C for ejecting C ink, the ejection port array 46M for ejecting M ink, and the ejection port array 46Y for ejecting Y ink. In the ejection head 42, the intervals g1 between adjacent ejection port arrays are the same. The ejection head 44 is located on the downstream side of the +X direction relative to the ejection head 42 and is equipped with the ejection port array 46RCT for ejecting the reaction liquid RCT. The ejection port array 46RCT is separated from the ejection port array 42Y, which is located at the most downstream of the ejection head 44 in the +X direction, by the interval g2 (g2>g1).

As described above, the reaction liquid RCT reacts with the color inks to promote solidification and thickening of the color inks. Specifically, the reaction liquid RCT does not contain color materials but contains a reactive component that reacts with the color materials contained in the color inks and solidifies and thickens the color inks if coming into contact with the color inks. Accordingly, the reaction liquid RCT suppresses bleeding of the color inks on the print medium P.

In the present embodiment, in each of the ejection port arrays 46, 1080 ejection ports 32 are arranged in the Y direction with intervals of 1200 dpi from the adjacent ejection ports 32. The ejection amount of liquid (color ink and reaction liquid) ejected at one time from one ejection port 32 is, for example, about 4.5 pl. Further, tanks (not illustrated in the drawings) for storing the corresponding ink or reaction liquid are respectively connected to the ejection port arrays 46, so that the inks and reaction liquid are supplied from the tanks. The tanks may be integrally configured with the head unit 24 or may be configured so as to be detachable from the carriage 22.

<Color Ink and Reaction Liquid>

Next, the color inks and the reaction liquid used in the printing apparatus 10 will be explained.

=Color Ink=

In the present embodiment, the printing apparatus 10 can use a pigment ink containing a pigment and a water-soluble resin fine particle ink containing no pigment or containing a trace amount of pigment. These pigment ink and water-soluble resin fine particle ink contain a water-soluble organic solvent. Various surfactants, defoaming agents, preservatives, antifungal agents, etc., can be appropriately added to the color inks so that the color inks have desired characteristics, if necessary.

The color ink contains water-soluble resin fine particles for bringing the print medium P and the color materials into close contact with each other and improving the scratch resistance (fixability) of printed images. The resin fine particles are melted by heat, and a heater (the heat application part 16 or the like) is used to form a film of the resin fine particles and dry the solvent contained in the ink. In the present embodiment, the resin fine particles are polymer fine particles that exist in a state of being dispersed in water. Further, the polymer fine particles existing in a state of being dispersed in water may be in a form of resin fine particles obtained by homopolymerizing a monomer having a dissociative group or copolymerizing multiple types of monomers, i.e., what is termed as the self-dispersion pigment fine particle dispersion.

The color inks contain a surfactant. As the surfactant, a penetrant for improving the permeability of the color inks to the print medium P dedicated to inkjet is used. In the present embodiment, the surface tension of each color ink is adjusted to be 30 dyn/cm or less, and the difference in surface tension between the respective color inks is adjusted to be within 2 dyn/cm. Specifically, the surface tension of each color ink is set to about 28 to 30 dyn/cm.

Further, as for the color inks, from the viewpoint of preventing impurity elution from the printing apparatus 10 and a member that is in contact with the ink in the head unit 24, deterioration of the materials configuring members, and deterioration of the solubility of the pigment dispersion resin in the ink, it is preferable that the pH thereof is 7.0 or more and 10.0 or less. For the color inks used in the present embodiment, an anionic color material is used. Therefore, the pH of each color ink is stable on the alkaline side and its value is 8.5 to 9.5.

=Reaction Liquid=

The reaction liquid contains a reactive component that reacts with the pigment contained in each color ink to aggregate or gel the pigment or a reactive component that reacts with a resin or the like to insolubilize those. For example, the reactive component is a component capable of destroying the dispersion stability of an ink if being blended with the ink which has a target component that is stably dispersed in an aqueous medium due to the action of an ionic group. As the reactive component, for example, an organic acid such as glutaric acid can be used. On the basis of the total mass of the composition contained in the reaction liquid, the content of the organic acid in the reaction liquid is preferably 3.0% by mass or more and 90.0% by mass or less and further preferably 5.0% by mass or more and 70.0% by mass or less. In addition, a surfactant is added to the reaction liquid, as with the color inks.

<Control Configuration of the Printing Apparatus>

Figure 5:
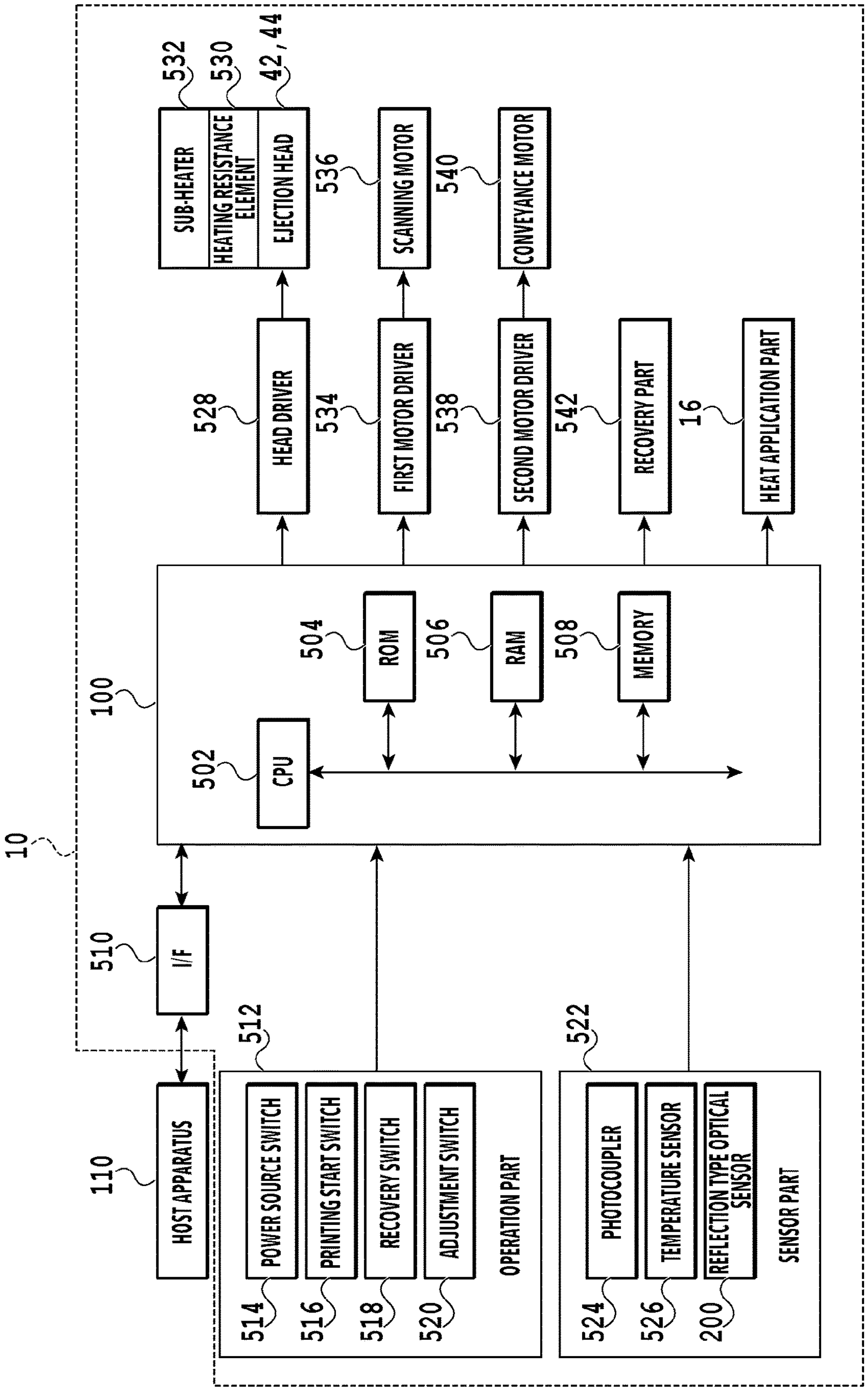
FIG. 5 is a block configuration diagram of a control system of the printing apparatus.

Next, the configuration of a control system of the printing apparatus 10 will be explained. FIG. 5 is a block configuration diagram of the control system of the printing apparatus 10.

The control part 100 that controls the entire printing apparatus 10 includes the central processing unit (CPU) 502 in the form of a microcomputer, the ROM 504, the RAM 506, and the memory 508. The CPU 502 controls the operation of each constituent member in the printing apparatus 10 and processes input image data, based on various programs. The ROM 504 functions as a memory for performing various kinds of control executed by the CPU 502 and for storing processing programs for image data, etc. The RAM 506 is used as a storage area such as a main memory and a work area of the CPU 502. The memory 508 stores various kinds of data such as a mask pattern and a test pattern, which will be described later.

The control part 100 is connected to the interface (I/F) 510 and is connected to the host apparatus 110 via the I/F 510. The host apparatus 110 outputs image data for printing, various kinds of commands, status signals, etc., to the control part 100 via the I/F 500. The host apparatus 110 may be capable of executing various kinds of processes necessary for printing, such as image data creation and image data processing.

The control part 100 is connected to the operation part 512 which is installed in the printing apparatus 10. The operation part 512 is a switch group that receives input from the user. In the present embodiment, the operation part 512 is equipped with the power source switch 514 for launching the printing apparatus 10, the printing start switch 516 for an instruction to start printing, and the recovery switch 518 for an instruction to perform the recovery process for the head unit 24. The recovery process is a process performed by the recovery part 542 to favorably maintain and recover the ejection condition of the inks and reaction liquid ejected from the ejection ports 32 of the head unit 24. Further, the operation part 512 is equipped with the adjustment switch 520 that performs adjustment for eliminating displacement of ejection positions of the reaction liquid. Although the start of printing, the recovery process, and the above-described adjustment are executed with the switches of the operation part 512 in the present embodiment, there is not a limitation as such. For example, it is also possible to execute the above-described processes, based on instructions from various kinds of apparatuses connected to the host apparatus 110 and the printing apparatus 10.

The control part 100 is connected to the sensor part 522 installed in the printing apparatus 10. The sensor part 522 is a sensor group for detecting the state of the printing apparatus 10 and is equipped with the optical sensor 200, the photocoupler 524 for detecting the home position, and the temperature sensor 526 for detecting the temperature. Further, each sensor is controlled by the control part 100, and various kinds of processes are executed based on the information from each sensor. For example, for the optical sensor 200, the control part 100 controls the driving thereof and obtains the optical characteristics of the test pattern, based on the output from the optical sensor 200. In this way, the control part 100 and the optical sensor 200 function as a measurement part capable of measuring the optical characteristics of the print product in the present embodiment. Note that the sensor part 522 is not limited to the above-described sensor and may be equipped with various publicly-known sensors for detecting the condition of the printing apparatus 10.

The control part 100 is connected to the head driver 528 and controls the driving of the head unit 24 via the head driver 528. The head unit 24 drives the heating resistance elements 530 of the ejection heads 42 and 44 according to print data via the head driver 528 to control the ejection and non-ejection of the inks or reaction liquid. The head driver 528 includes a shift register that aligns print data according to the positions of the heating resistance elements 530, a latch circuit that performs latching at an appropriate timing, and an ethical circuit element that operates the heating resistance elements 530 in synchronization with driving timing signals. The sub-heaters 532 are installed on the ejection heads 42 and 44, and the driving of the sub-heaters 532 is controlled by the control part 100 via the head driver 528. The sub-heaters 532 adjust the temperature for stabilizing the ejection characteristics of ink and are attached to the ejection head substrate or the ejection heads 42 and 44 together with the heating resistance element 530.

The control part 100 is connected to the first motor driver 534 and controls the driving of the scanning motor 536 that displaces the head unit 24 in the X direction via the first motor driver 534. Moreover, the control part 100 is connected to the second motor driver 538 and controls the conveyance motor 540 via the second motor driver 538 to displace the print medium P in the Y direction with the conveyance roller 23. Further, the control part 100 is connected to the recovery part 542 and controls the driving of the recovery part 542. Furthermore, the control part 100 is connected to the heat application part 16 and controls the driving of the heat application part 16.

In the control part 100, the CPU 502 converts image data that is input from the host apparatus 110 into print data, which is to be stored in the RAM 506. Specifically, if the CPU 502 obtains image data that is represented by the information of 256 values (0 to 255), i.e., RGB of 8-bit each, this image data is converted into multi-valued data which is represented by multiple types of inks used in printing (which are K, C, M, and Y in the present embodiment). By this color conversion process, multi-valued data which is represented by the information of 256 values (0 to 255) of 8 bits that defines the tone of each K, C, M, or Y ink in each pixel group consisting of multiple pixels is generated.

Next, quantization of the multi-valued data represented by K, C, M, and Y is executed, so as to generate quantized data (binary data) represented by 1-bit binary information (0, 1) which determines the ejection or non-ejection of each K, C, M, or Y ink for each pixel. As this quantization process, various publicly-known quantization methods such as an error diffusion method, a dither method, and an index method can be used. Thereafter, distribution processing is performed for distributing the quantized data for multiple times of scanning to be performed by the head unit 24 on the unit areas. This distribution processing generates the print data which is represented by 1-bit binary information (0, 1) that determines whether each K, C, M, or Y ink is ejected or not ejected for each pixel in each of multiple times of scanning performed on the unit areas of the print medium P. This distribution processing corresponds to multiple times of scanning and is performed using a mask pattern that determines whether ejection of ink is allowed or not allowed on each pixel. Note that generation of such print data is not limited to that being executed by the control part 100, and the generation may be executed by the host apparatus 110. Further, it is also possible that a part of the processing is performed by the host apparatus 110 and the remaining processing is executed by the control part 100.

<Obtainment Processing>

With the above configurations, the printing apparatus 10 performs the print processing for performing printing on the print medium P, based on printed data. In this print processing, the head unit 24 performs printing on the unit areas of a print medium by ejecting inks and a reaction liquid while moving in the X direction. In such printing, basically, the predetermined amounts of inks and reaction liquid are respectively ejected in the same area. Accordingly, the reaction liquid comes into contact with the inks at a constant ratio, and thus it is possible to obtain the effect of suppressing the ink bleeding that occurs especially remarkably on a non-absorptive print medium. Further, the printing apparatus 10 performs printing in such a manner that the print medium P on which the inks and the reaction liquid have been ejected is conveyed and made to pass through the heat application part 16 in order to heat and dry the inks so that the fixation of the inks is promoted even on a non-absorptive or poorly-absorptive print medium.

As described above, in the printing apparatus 10, it is necessary that the inks and the reaction liquid are ejected in the same area. Therefore, the printing apparatus 10 is configured to obtain the displacement amount of the ejection position of the reaction liquid relative to the ejection position of the inks in the X direction, so as to be capable of correcting the ejection position of the reaction liquid relative to the ejection position of the inks, based on the obtained displacement amount. In the present embodiment, "the displacement amount of the ejection position of the reaction liquid relative to the ejection position of the inks in the X direction" is also referred to as "the displacement amount of the ejection position of the reaction liquid". The obtainment processing for obtaining the displacement amount of the ejection position of the reaction liquid relative to the ejection position of the inks is started by an operation of the adjustment switch 520 in the operation part 512, for example. The printing apparatus 10 performs correction so that the ejection position of the inks and the ejection position of the reaction liquid match each other, based on the displacement amount of the ejection position of the reaction liquid which is obtained in this obtainment processing.

Hereinafter, the obtainment processing, which is executed by the printing apparatus 10 to obtain the displacement amount of the ejection position of the reaction liquid relative to the ejection position of the inks in the X direction, and the test pattern used in the obtainment processing will be explained in detail.

=Test Pattern=

Figure 6:
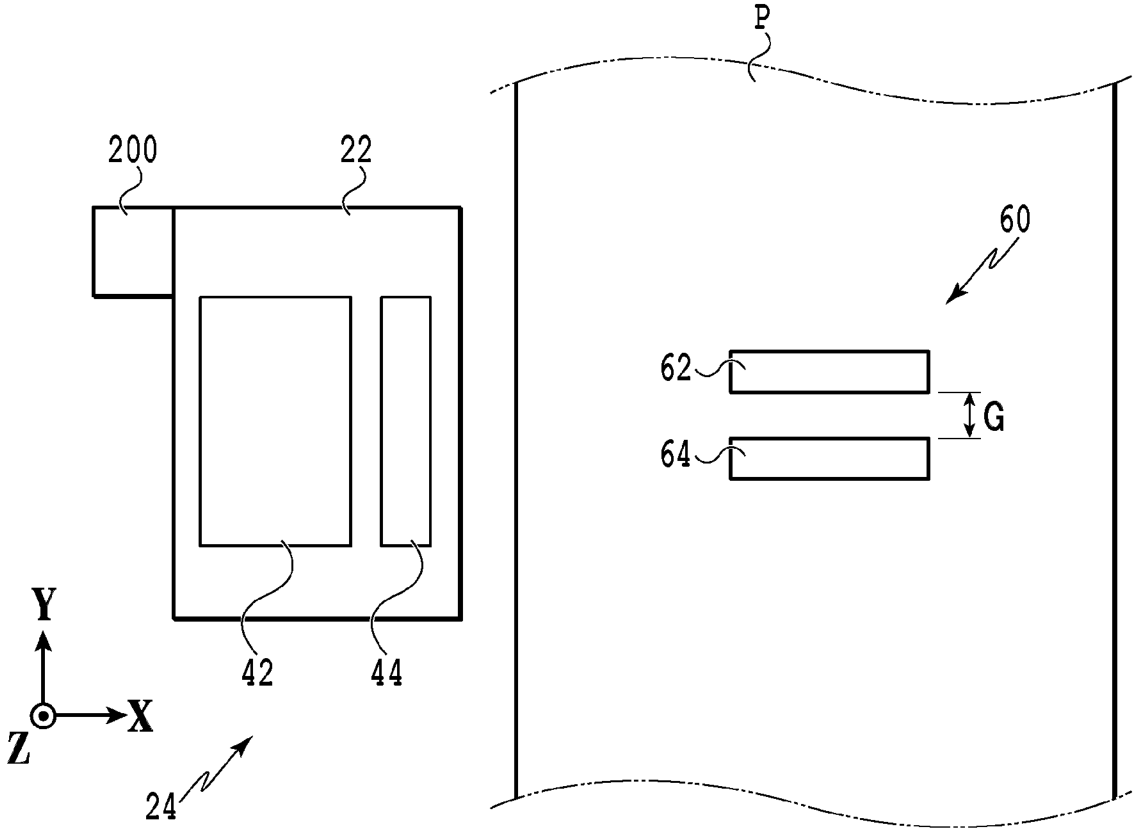
FIG. 6 is a schematic diagram of a test pattern.
Figure 7A:
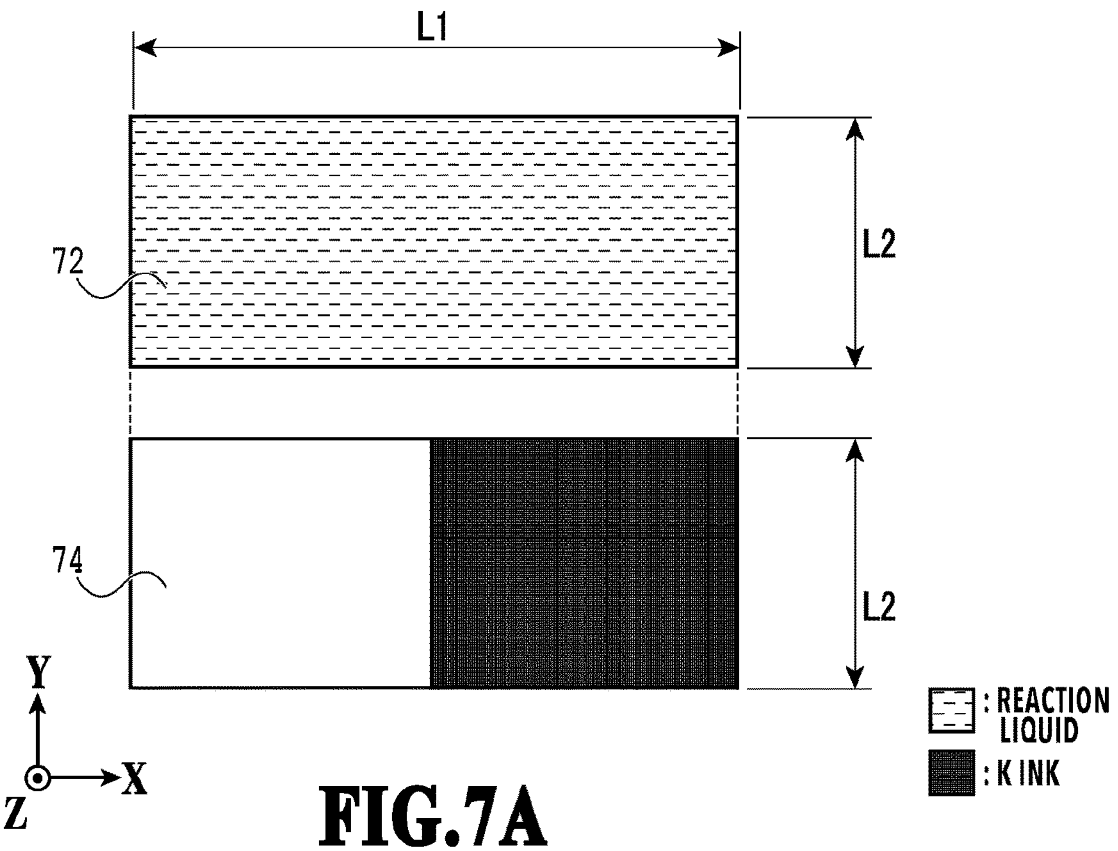
FIG. 7A and FIG. 7B are diagrams illustrating a configuration pattern of two detection patterns configuring a test pattern.
Figure 7B:
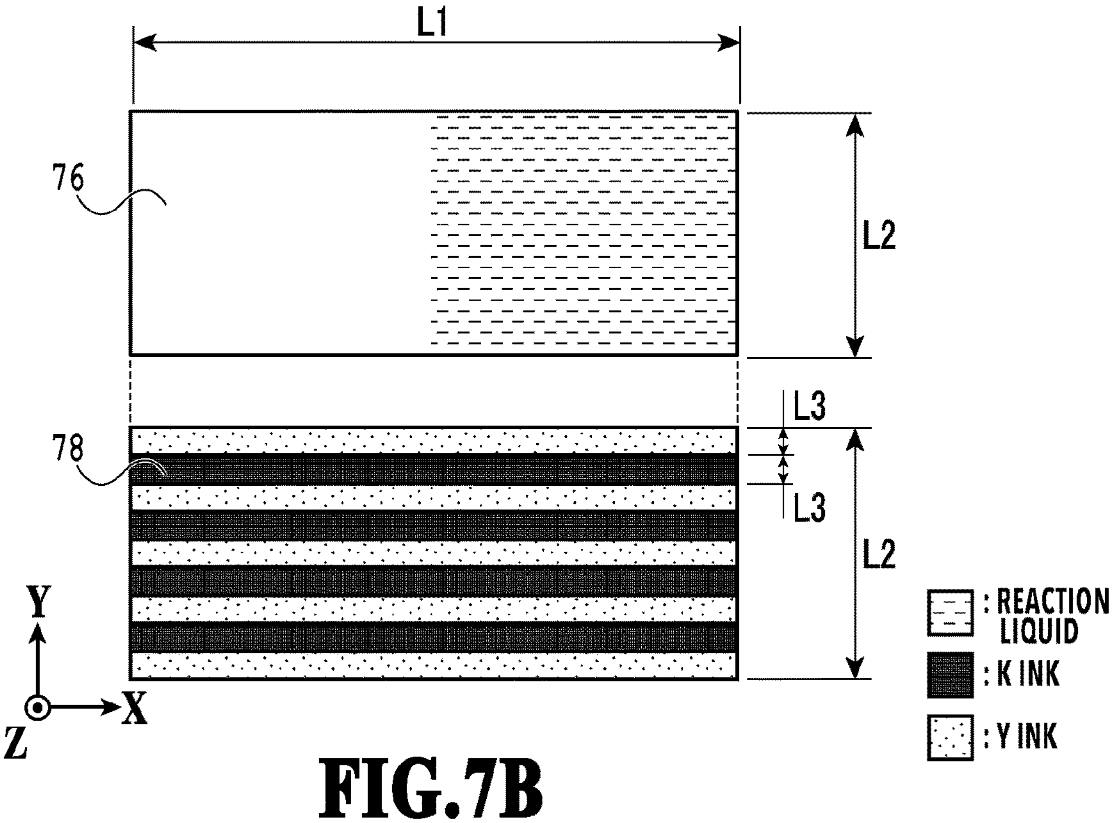
Figure 8A:
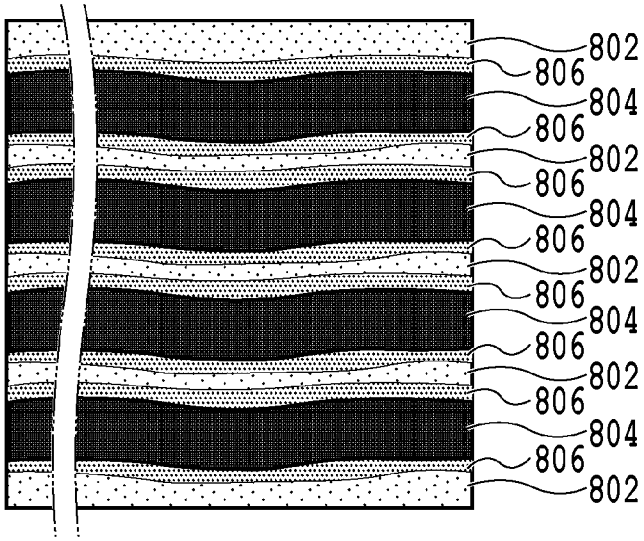
FIG. 8A and FIG. 8B are diagrams for explaining bleeding in a pattern formed with two different inks.
Figure 8B:
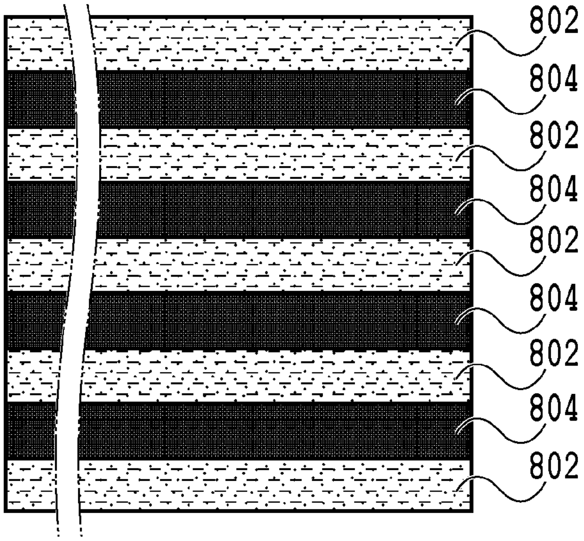

First, the test pattern used in the obtainment processing will be explained. In FIG. 6, the test pattern used for the obtainment processing is illustrated, and FIG. 6 is illustrated so as to correspond to the head unit that ejects the inks and the reaction liquid. FIG. 7A is a diagram illustrating a configuration pattern of the first detection pattern of the test pattern, and FIG. 7B is a diagram illustrating a configuration pattern of the second detection pattern of the test pattern. FIG. 8A and FIG. 8B are diagrams for explaining the bleeding which occurs in the fourth pattern of FIG. 7B. Further, FIG. 8A indicates a state in which the bleeding has occurred without using the reaction liquid, and FIG. 8B indicates a state in which bleeding does not occur due to the use of the reaction liquid.

The test pattern 60 used for the obtainment processing includes the first detection pattern 62 for detecting the ejection position of the inks in the X direction and the second detection pattern 64 for detecting the ejection position of the reaction liquid in the X direction (see FIG. 6). The first detection pattern 62 is a pattern for obtaining the ejection position of the inks and is a reference pattern to be used as a reference for obtaining the displacement amount of the ejection position of the reaction liquid. The second detection pattern 64 is a pattern for obtaining the ejection position of the reaction liquid and is a pattern to be compared with the first detection pattern 62 in order to obtain the displacement amount of the ejection position of the reaction liquid.

The first detection pattern 62 and the second detection pattern 64 are configured to have the same length in the X direction and the same length in the Y direction. Further, the second detection pattern 64 is located on the upstream side of the +Y direction relative to the first detection pattern 62 with a predetermined interval G. In the present embodiment, it is assumed that the predetermined interval G is the same length as the length of the first detection pattern 62 and the second detection pattern 64 in the Y direction. The predetermined interval G is not limited as such and may be longer or shorter than the length of the first detection pattern 62 in the Y direction. Further, although the second detection pattern 64 is formed on the upstream side of the +Y direction relative to the first detection pattern 62 in the present embodiment, there is not a limitation as such, and it is also possible that the second detection pattern 64 is formed on the downstream side of the +Y direction relative to the first detection pattern 62. Alternatively, they may be formed so as to match in the Y direction and be arranged side by side along the X direction.

The test pattern 60 is printed by one movement (scanning) of the head unit 24 in the +X direction. That is, the first detection pattern 62 is formed by ejecting inks and the reaction liquid from the multiple ejection ports 32 in the ejection port arrays 46 of the ejection heads 42 and 44. Further, the second detection pattern 64 is formed by ejecting inks and the reaction liquid from the multiple ejection ports 32 located on the upstream side of the +Y direction relative to the ejection ports 32 that are used for the first detection pattern 62.

The first detection pattern 62 is configured with the first pattern 72 for ejecting the reaction liquid and the second pattern 74 for ejecting the K ink (see FIG. 7A). The first pattern 72 and the second pattern 74 each have the length L1 in the X direction and the length L2 in the Y direction. In the present embodiment, it is assumed that the length L1 is the length in which 1080 dots are printed at a resolution of 1200 dpi. Further, it is assumed that the length L2 is the length in which 180 dots are printed at a resolution of 1200 dpi.

The first pattern 72 is the pattern in which the reaction liquid is ejected at a resolution of 1200 dpi in the entire area. That is, in the first pattern 72, the reaction liquid is ejected so that one dot is arranged for each pixel of the entire area sectioned into a grid of 1200 dpi×1200 dpi. Therefore, in the first pattern 72, the reaction liquid is ejected by the continuous 180 ejection ports 32 of the ejection port array 46RCT so that 1080 dots are printed in the X direction from the printing start position at a resolution of 1200 dpi. Note that, in the following explanation, it is assumed that the position where the M-th dot is printed is expressed as Mdot/1200 dpi. Therefore, in the first pattern 72, the reaction liquid is ejected in the area from 1 dot/1200 dpi where the first dot is printed, which is the printing start position, to 1080 dot/1200 dpi where the 1080-th dot is printed with respect to the X direction.

In the second pattern 74, a non-ejection area where the K ink is not ejected is formed in the half thereof located on the upstream side of the +X direction, and an ejection area where the K ink is ejected is formed in the half thereof located on the downstream side of the +X direction. That is, the second pattern 74 is a pattern in which the K ink is ejected at a resolution of 1200 dpi to the half area on the downstream side of the +X direction. That is, in the second pattern 74, the K ink is ejected by the 180 continuous ejection ports 32 of the ejection port array 46K so that 540 dots are printed in the X direction at a resolution of 1200 dpi from the center position of the X direction in the second pattern 74. Therefore, in the second pattern 74, the K ink is ejected in the area from 541 dot/1200 dpi to 1080 dot/1200 dpi with respect to the X direction. Note that, as for the 180 ejection ports 32 used for printing the second pattern 74, the ejection area thereof overlaps the ejection area of the 180 ejection ports 32 used for printing the first pattern 72 with respect to the Y direction. That is, the first pattern 72 and the second pattern 74 are ejected to the same area on the print medium P to form the first detection pattern 62.

The second detection pattern 64 is configured with the third pattern 76 for ejecting the reaction liquid and the fourth pattern 78 for ejecting the K ink and the Y ink (see FIG. 7B). The third pattern 76 and the fourth pattern 78 each have the length L1 in the X direction and the length L2 in the Y direction, and the sizes thereof are the same as those of the first pattern 72 and the second pattern 74.

In the third pattern 76, a non-ejection area where the reaction liquid is not ejected is formed in the half thereof located on the upstream side of the +X direction, and an ejection area where the reaction liquid is ejected is formed in the half thereof located on the downstream side of the +X direction. That is, the third pattern 76 is a pattern in which the reaction liquid is ejected at a resolution of 1200 dpi to the half area on the downstream side of the +X direction. That is, in the third pattern 76, the reaction liquid is ejected by the 180 continuous ejection ports 32 of the ejection port array 46RCT so that 540 dots are printed in the X direction at a resolution of 1200 dpi from the center position of the X direction in the third pattern 76. Therefore, in the third pattern 76, the reaction liquid is ejected in the area from 541 dot/1200 dpi to 1080 dot/1200 dpi with respect to the X direction.

Note that the 180 continuous ejection ports 32 used for printing the third pattern 76 are located on the upstream side of the +Y direction relative to the 180 continuous ejection ports 32 used for printing the first pattern 72. In the present embodiment, the ejection port 32 located at the most downstream in the +Y direction among the 180 ejection ports 32 used for the third pattern 76 and the ejection port 32 located at the most upstream in the +Y direction among the continuous 180 ejection ports 32 used for the first pattern 72 are distant from each other by 180 ejection ports.

The fourth pattern 78 is a pattern in which printing is alternately performed in the Y direction so that the printing area with the K ink and the printing area with the Y ink are adjacent to each other in the entire area. Both K ink and Y ink are printed at a resolution of 1200 dpi in each printing area. Both of the printing area with the K ink and the printing area with the Y ink have the length L3 in the Y direction. In the fourth pattern 78, the length L3 has a value that is smaller than the half of the length L2 so that multiple ejection areas are formed with each of the K ink and the Y ink. In the present embodiment, it is assumed that the length L3 is the length corresponding to 20 dots at a resolution of 1200 dpi. Therefore, in the fourth pattern 78 of the present embodiment, the five printing areas with the Y ink and the four printing areas with the K ink are formed. Note that the continuous 180 ejection ports 32 used for printing the fourth pattern 78 are the ejection ports 32 capable of ejecting to the ejection area that matches the ejection area of the continuous 180 ejection ports 32 used for printing the third pattern 76 with respect to the Y direction. That is, the third pattern 76 and the fourth pattern 78 are ejected to the same area on the print medium P, so as to form the second detection pattern 64.

By the way, in the fourth pattern 78, the K ink and the Y ink are ejected from the ejection port array 46K and the ejection port array 46Y in one scanning of the head unit 24 in the +X direction. Therefore, if the fourth pattern 78 is printed on a non-absorptive or poorly-absorptive print medium without using the reaction liquid, bleeding occurs at the boundary between the printing area 802 with the Y ink and the printing area 804 with the K ink (see FIG. 8A). In the bleeding area 806 where the bleeding occurs, the Y ink with high lightness and the K ink with low lightness are blended, and thus the characteristics of the K ink with low lightness are strongly exhibited. That is, in this case, the optical characteristics of the fourth pattern 78 become closer to those of the K ink. On the other hand, if the fourth pattern 78 is printed on a non-absorptive or poorly-absorptive print medium after ejecting the reaction liquid, bleeding does not occur or bleeding occurs a little at the boundary portion between the printing area 802 and the printing area 804 due to the characteristics of the reaction liquid. Therefore, in this case, the optical characteristics of the fourth pattern 78 are not affected (see FIG. 8B). In this way, the fourth pattern 78 is a pattern whose optical characteristics change depending on whether or not the reaction liquid is used.

=Obtainment Processing=

If the adjustment switch 520 is operated, the printing apparatus 10 performs the obtainment processing for obtaining the displacement amount of the ejection position of the reaction liquid relative to the ejection position of the inks in the X direction. Thereafter, a correction value for eliminating the displacement of the ejection position of the reaction liquid is obtained based on the displacement amount obtained in the obtainment processing, and the correction value is set to be used in the print processing.

Figure 9:
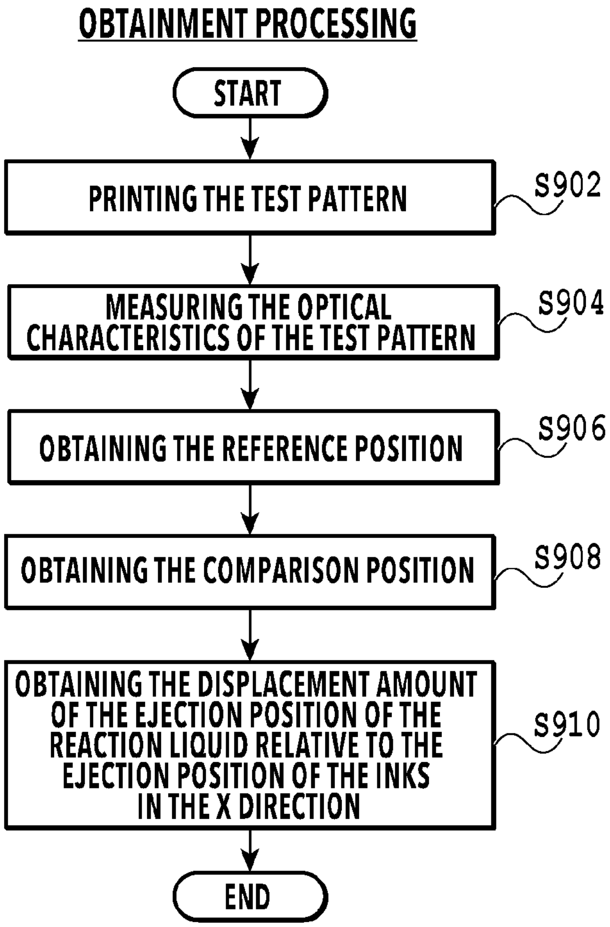
FIG. 9 is a flowchart illustrating a detailed processing routine of obtainment processing.
Figure 10A:
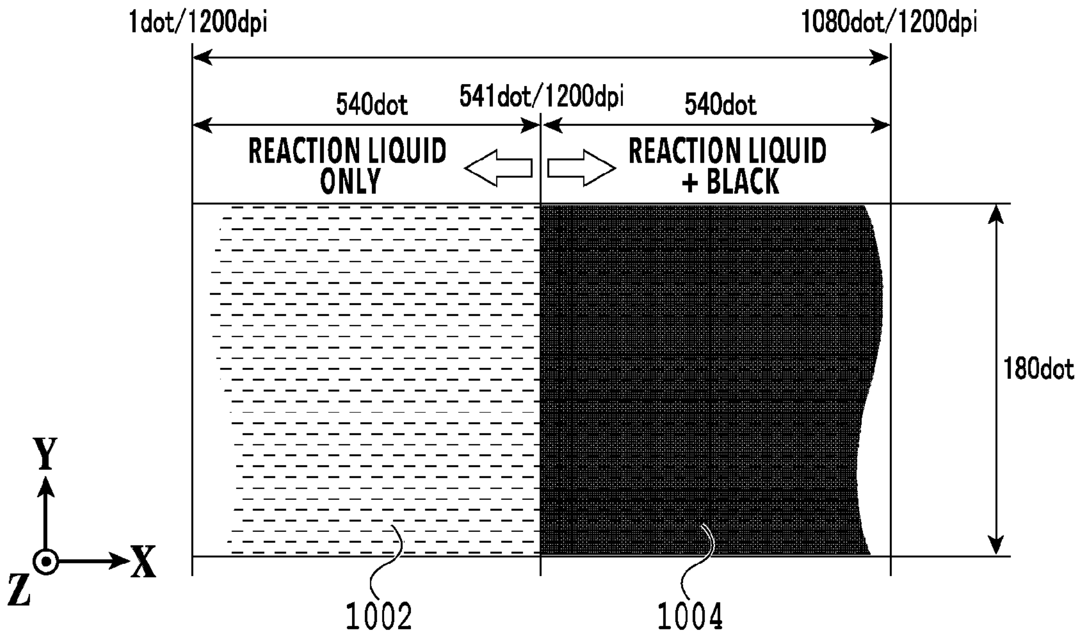
FIG. 10A and FIG. 10B are diagrams illustrating two printed detection patterns.
Figure 10B:
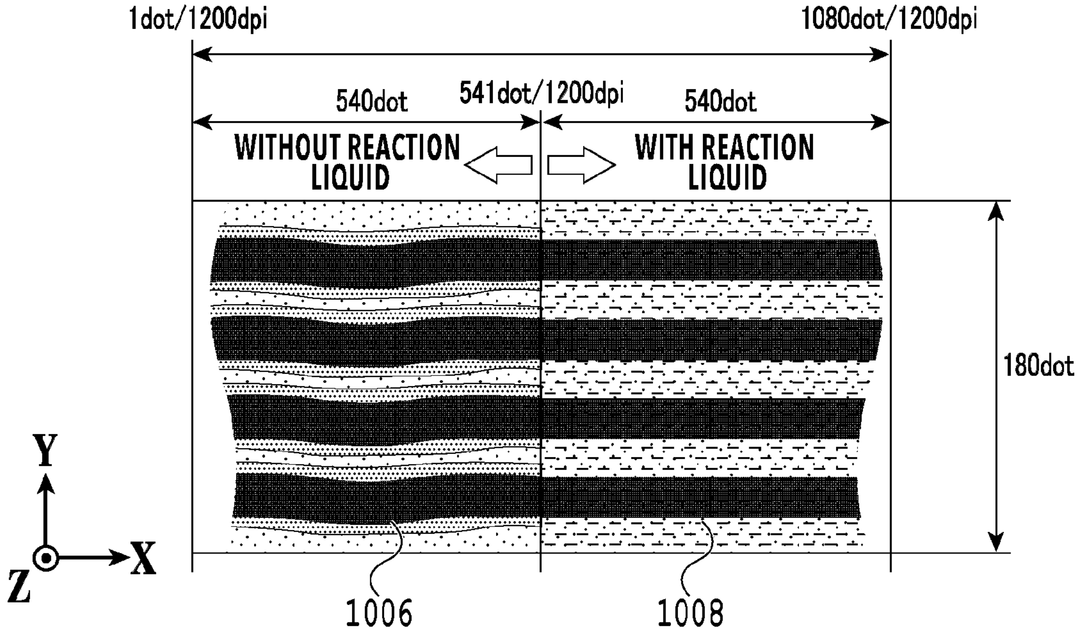

Hereinafter, the obtainment processing will be explained in detail. FIG. 9 is a flowchart illustrating a detailed processing routine of the obtainment processing. FIG. 10A is a diagram illustrating the printed first detection pattern, and FIG. 10B is a diagram illustrating the printed second detection pattern. FIG. 11A is a diagram for explaining the measurement of the optical characteristics of the first detection pattern. FIG. 11B is a diagram illustrating the change of the optical characteristics in the X direction in the first detection pattern. FIG. 11C is a diagram for explaining the measurement of the optical characteristics of the second detection pattern. FIG. 11D is a diagram illustrating the change of optical characteristics in the X direction in the second detection pattern.

The series of the processes illustrated in the flowchart of FIG. 9 is performed by the CPU 502 expanding a program code stored in the ROM 504 into the RAM 506 and executing the program code. Alternatively, a part or all of the functions in the steps of FIG. 9 may be executed by hardware such as an ASIC or an electronic circuit. Note that the sign "S" in the explanation of each process means that it is a step of the flowcharts.

If the obtainment processing is started, the CPU 502 first prints the test pattern 60 on the print medium (S902). As patterns for forming the test pattern 60, the memory 508 stores the patterns enabling printing of the first detection pattern 62 and the second detection pattern 64 with one scanning performed by the head unit 24 in the +X direction. In S902, these patterns are used to print the test pattern 60 with the reaction liquid and the K ink and Y ink during one scanning performed by the head unit 24 in the +X direction. In this way, in the present embodiment, the control part 100 including the CPU 502 functions as a control part that controls the head unit 24 to print a test pattern.

As in FIG. 10A, in the printed first detection pattern 62, only the reaction liquid is ejected in the area 1002 from 1 dot/1200 dpi to 540 dot/1200 dpi with respect to the X direction. Further, the K ink is ejected together with the reaction liquid in the area 1004 from 541 dot/1200 dpi to 1080 dot/1200 dpi with respect to the X direction. Note that the ejection port array 46RCT which is configured with the ejection ports 32 that eject the reaction liquid is located on the downstream side of the +X direction relative to the ejection port array 46K which is configured with the ejection ports 32 that eject the K ink and the ejection port array 46Y which is configured with the ejection ports 32 that eject the Y ink (see FIG. 4). Therefore, in the first detection pattern 62 printed with one scanning in the +X direction, the reaction liquid is ejected to the entire area thereof using the first pattern 72, and then the K ink is ejected using the second pattern 74. Accordingly, no bleeding occurs at the boundary between the area 1002 and the area 1004.

Further, as in FIG. 10B, in the printed second detection pattern 64, the K ink and Y ink are ejected in the area 1006 from 1 dot/1200 dpi to 540 dot/1200 dpi with respect to the X direction. Further, the K ink and Y ink are ejected together with the reaction liquid in the area 1008 from 541 dot/1200 dpi to 1080 dot/1200 dpi with respect to the X direction.

As described above, the ejection port array 46RCT is located on the downstream side of the +X direction relative to the ejection port array 46K and the ejection port array 46Y. Therefore, in the second detection pattern 64 which is printed with one scanning in the +X direction, the reaction liquid is not ejected and the K ink and Y ink are ejected in the area 1006. Further, in the area 1008, the K ink and Y ink are ejected after the reaction liquid is ejected. Therefore, in the area 1006, the bleeding areas 806 occur at the boundary between the printing areas 802 with the Y ink and the printing areas 804 with the K ink. Further, in the area 1008, bleeding areas 806 do not occur at the boundary between the printing areas 802 and the printing areas 804 due to the presence of the reaction liquid. Furthermore, due to the presence of the reaction liquid, no bleeding occurs at the boundary between the area 1006 and the area 1008 as well.

Returning to FIG. 9, after the printing of the test pattern 60, the CPU 502 then measures the optical properties of the printed test pattern 60 (S904). That is, in S904, the optical characteristics of the first detection pattern 62 and the second detection pattern 64 configuring the test pattern 60 are measured, respectively, so that the change in the optical characteristics in the X direction will be obtained. Specifically, first, in order to measure the optical characteristics of the first detection pattern 62, the head unit 24 is moved to the printing start position, that is, the position where the detection spot 310 of the optical sensor 200 overlaps 1 dot/1200 dpi in the X direction. Further, the print medium P is conveyed to the position where the center of the detection spot 310 overlaps the center of the first detection pattern 62 in the Y direction. In the present embodiment, the diameter of the detection spot is 3 mm, and the length of the first detection pattern 62 and the second detection pattern 64 in the Y direction is 3.8 mm (which corresponds to 180 dots at a resolution of 1200 dpi). Thereafter, while scanning the head unit 24 in the +X direction, the optical characteristics (optical reflectivity) of the area 1002 and area 1004 are measured by the optical sensor 200 at a predetermined interval such as 2400 dpi, for example (see FIG. 11B). Note that, as the optical characteristics of the first detection pattern 62, the control part 100 stores the measurement result (optical reflectivity), which is output from the optical sensor 200, in a storage area such as the memory 508 in association with the measurement position (encoder signal value).

Next, in order to measure the optical characteristics of the second detection pattern 64, the head unit is moved to the printing start position, that is, the position where the detection spot 310 of the optical sensor 200 overlaps with 1 dot/1200 dpi in the X direction. Further, the print medium P is conveyed to the position where the center of the detection spot 310 overlaps with the center of the second detection pattern 64 in the Y direction. Thereafter, while making the head unit 24 perform scanning in the +X direction, the optical characteristics of the area 1006 and area 1008 are measured by the optical sensor 200 at an interval of 2400 dpi, for example (see FIG. 11C). Note that, as the optical characteristics of the second detection pattern 64, the control part 100 stores the measurement result (optical reflectivity), which is output from the optical sensor 200, in a storage area such as the memory 508 in association with the measurement position (encoder signal value). In this way, in the present embodiment, the control part 100 including the CPU 502 functions as a control part that controls the optical sensor 200 to measure the optical characteristics of a test pattern.

Returning to FIG. 9, after the measurement of the optical characteristics of the test pattern 60, the CPU 502 then obtains the reference position corresponding to the ink ejection position which is to be the reference for obtaining the displacement amount of the ejection position of the reaction liquid in the X direction (S906). In the present embodiment, the reaction liquid is ejected to the entire area of the first detection pattern 62 in the X direction while scanning in the +X direction, and, further, the K ink is ejected to the half area on the downstream side of the +X direction of the first detection pattern in the X direction while scanning in the +X direction. Thus, if the ejection position of the K ink is displaced in the X direction, the boundary between the area 1002 and the area 1004 is also displaced in the X direction according to the displacement. Therefore, in S906, the boundary between the area 1002 and the area 1004 is obtained as the reference position, based on the optical characteristics of the first detection pattern 62.

The measurement result of the first detection pattern 62 in S904 is as illustrated in FIG. 11B. That is, in the area 1002 where only the reaction liquid is ejected, the optical reflectivity is high based on the color of the print medium. Then, as the overlap of the detection spot 310 with the area 1004 increases due to the movement of the head unit 24 in the +X direction, the optical reflectivity decreases due to the influence of the color developed by the K ink. Further, if the entire detection spot 310 enters the area 1004 due to the further movement of the head unit 24 in the +X direction, the optical reflectivity becomes constant at a low value based on the color developed by the K ink. Thus, it can be seen that the boundary between the area 1002 and the area 1004 has optical reflectivity of the intermediate value between the optical reflectivity at the time where the entire detection spot 310 is located in the area 1002 and the optical reflectivity at the time where the entire detection spot 310 is located in the area 1004.

Therefore, in S906, first, the optical characteristics (optical reflectivity) of the measurement positions 1102 which are set in advance on the area 1002 side are obtained, and the average value R1 of the obtained optical reflectivity is obtained. It is assumed that the measurement positions 1102 are the central positions in the X direction in the area 1002, and, specifically, the five points in the vicinity of 270 dot/1200 dpi, for example. Next, the optical reflectivity of the measurement positions 1104 which are set in advance on the area 1004 side is obtained, and the average value R2 of the obtained optical reflectivity is obtained. It is assumed that the measurement positions 1104 are the central positions in the X direction in the area 1004, and, specifically, the five points in the vicinity of 810 dot/1200 dpi, for example. Note that the optical reflectivity of each measurement position is based on the measurement result in S904 which is stored in a storage area such as the memory 508.

Thereafter, the intermediate value between the average value R1 and the average value R2 is obtained, and the position corresponding to the obtained intermediate value is obtained as the reference position 1110. In the storage area such as the memory 508, the measurement positions and the optical reflectivity of the first detection pattern 62 measured in S904 are stored in association with each other. Therefore, with reference to the information stored in the storage area, the measurement position in which the optical reflectivity matches or is the closest to (R1+R2)/2, that is, the value obtained by dividing the sum of the average values R1 and R2 by 2, is obtained as the reference position 1110. Note that the measurement positions 1102 and 1104 are not limited to the five points and may be one to four points or six points or more. Further, the measurement positions 1102 may be any positions as long as the detection spot 310 is located only in the area 1002, and the measurement positions 1104 may be any positions as long as the detection spot 310 is located only in the area 1004.

Returning to FIG. 9, after the obtainment of the reference position 1110, the CPU 502 then obtains the comparison position corresponding to the ejection position of the reaction liquid, which is to be compared with the reference position obtained in S906 (S908). In the present embodiment, the reaction liquid is ejected to the half area on the downstream side of the +X direction of the second detection pattern 64 with respect to the X direction while scanning in the +X direction, and the K ink and Y ink are ejected to the entire area of the second detection pattern 64 with respect to the X direction. Thus, if the ejection position of the reaction liquid is displaced in the X direction, the boundary between the area 1006 and the area 1008 is also displaced in the X direction according to the displacement. Therefore, in S908, the boundary between the area 1006 and the area 1008 is obtained as the comparison position, based on the optical characteristics of the second detection pattern 64.

The measurement result of the second detection pattern 64 in S904 is as illustrated in FIG. 11D. That is, in the area 1006 where the reaction liquid is not ejected and the pattern is formed with the K ink and Y ink, the bleeding areas 806 occur at the boundary between the printing areas 802 with the Y ink and the printing areas 804 with the K ink, so that the characteristics of the K ink are strongly exhibited and the optical reflectivity is low. Then, as the overlap of the detection spot 310 with the area 1008 increases due to the movement of the head unit 24 in the +X direction, the optical reflectivity increases due to the influence of the area 1008. Further, if the entire detection spot 310 enters the area 1008 due to the further movement of the head unit 24 in the +X direction, the bleeding areas 806 disappear and the characteristics of the Y ink appear, so that the optical reflectivity becomes constant at a high value. Therefore, it can be seen that the boundary between the area 1006 and the area 1008 has optical reflectivity of the intermediate value between the optical reflectivity at the time where the entire detection spot 310 is located in the area 1006 and the optical reflectivity at the time where the entire detection spot 310 is located in the area 1008.

Therefore, in S908, first, the optical reflectivity of the measurement positions 1106 which are set in advance on the area 1006 side are obtained, and the average value R3 of the obtained optical reflectivity is obtained. It is assumed that the measurement positions 1106 are the central positions in the X direction in the area 1006, and, specifically, the five points in the vicinity of 270 dot/1200 dpi, for example. Next, the optical reflectivity of the measurement positions 1108 which are set in advance on the area 1008 side is obtained, and the average value R4 of the obtained optical reflectivity is obtained. It is assumed that the measurement positions 1108 are the central positions of the obtained optical reflectivity in the X direction, and, specifically, the five points in the vicinity of 810 dot/1200 dpi, for example. The optical reflectivity of each measurement position is based on the measurement result in S904 which is stored in a storage area such as the memory 508.

Thereafter, the intermediate value between the average value R3 and the average value R4 is obtained, and the position corresponding to the obtained intermediate value is obtained as the comparison position 1112. In the storage area such as the memory 508, the measurement positions and the optical reflectivity of the second detection pattern 64 measured in S904 are stored in association with each other. Therefore, with reference to the information stored in the storage area, the measurement position in which the optical reflectivity matches or is the closest to (R3+R4)/2, that is, the value obtained by dividing the sum of the average values R3 and R4 by 2, is obtained as the comparison position 1112. Note that the measurement positions 1106 and 1108 are not limited to the five points and may be one to four points or six points or more. Further, the measurement positions 1106 may be any positions as long as the detection spot 310 is located only in the area 1006, and the measurement positions 1108 may be any positions as long as the detection spot 310 is located only in the area 1008.

Returning to FIG. 9, after the obtainment of the comparison position 1112, the CPU 502 then obtains the displacement amount of the ejection position of the reaction liquid relative to the ejection position of the inks in the X direction, based on the reference position 1110 and the comparison position 1112 (S910), and ends this obtainment processing. In S910, the difference between the encoder signal value representing the reference position 1110 and the encoder signal value representing the comparison position 1112 is obtained, and the obtained value is used as the displacement amount. In this way, in the present embodiment, the control part 100 including the CPU 502 functions as an obtainment part that obtains the displacement amount of the ejection position of the reaction liquid, based on the optical characteristics of the detection pattern configuring a test pattern.

If the displacement amount of the ejection position of the reaction liquid is obtained in the obtainment processing, the control part 100 will calculate a correction value for correcting the ejection timing of the reaction liquid, based on the displacement amount, so that the ejection position of the reaction liquid matches the ejection position of the inks, for example. Then, in the print processing for performing printing on the print medium, the control part 100 performs printing with correction of the timing of ejecting the reaction liquid with the head unit 24 by use of the calculated correction value. In this way, in the present embodiment, the control part 100 functions as a correction part for correcting the ejection position of the reaction liquid, based on the obtained displacement amount.

As explained above, in order to obtain the displacement amount of the ejection position of the reaction liquid relative to the ejection position of the inks in the X direction, the printing apparatus 10 prints the test pattern 60 including the first detection pattern 62 and second detection pattern 64 extending in the X direction. In the first detection pattern 62 being divided into two in the X direction, which is the scanning direction at the time of printing, the area 1002 where only the reaction liquid is ejected is formed in the half on the upstream side of the +X direction, and the area 1004 where the K ink is ejected on the reaction liquid is formed in the half on the downstream side of the +X direction. In the second detection pattern 64 being divided into two in the X direction, which is the scanning direction at the time of printing, the area 1006 where the reaction liquid is not ejected and the K ink and Y ink are alternately ejected in the Y direction is formed in the half on the upstream side of the +X direction. Further, the area 1008 where the K ink and Y ink are alternately ejected in the Y direction on the reaction liquid is formed in the half on the downstream side of the +X direction.

Further, the optical sensor 200 obtains the change in the optical reflectivity of the first detection pattern 62 and the second detection pattern 64 in the X direction. Further, based on this change, the reference position 1110 which corresponds to the ejection position of the inks is obtained from the first detection pattern 62. In addition, the comparison position 1112 which corresponds to the ejection position of the reaction liquid is obtained from the second detection pattern 64. Thereafter, based on the reference position 1110 and the comparison position 1112, the displacement amount of the ejection position of the reaction liquid relative to the ejection position of the inks in the X direction is obtained.

Accordingly, even if the ejection head 42 for ejecting the inks and the ejection head 44 for ejecting the reaction liquid are configured separately, the displacement amount of the ejection position of the reaction liquid can be obtained by use of the test pattern 60. That is, regardless of the configuration of the ejection head, the displacement amount of the ejection position of the reaction liquid relative to the ejection position of the inks in the X direction can be obtained by use of the test pattern 60.

Second Embodiment

Next, with reference to FIG. 12A to FIG. 14D, an explanation will be given of a printing apparatus according to the second embodiment. In the following explanation, the same or corresponding configurations as those of the printing apparatus according to the first embodiment described above are assigned with the same signs as those used in the first embodiment, so as to omit detailed explanations thereof.

The second embodiment is different from the above-described first embodiment in the aspect of obtaining the displacement amount of the ejection position of the reaction liquid in the backward direction, which is the −X direction, relative to the ejection position of the reaction liquid in the forward direction, which is the +X direction. Therefore, in the present embodiment, the "displacement amount of the ejection position of the reaction liquid" indicates "the displacement amount of the ejection position of the reaction liquid in the backward direction relative to the ejection position of the reaction liquid in the forward direction". Further, the obtainment processing executed by the printing apparatus 10 according to the present embodiment is processing of obtaining the displacement amount of the ejection position of the reaction liquid in the backward direction relative to the ejection position of the reaction liquid in the forward direction.

The printing apparatus 10 of the present embodiment has a configuration that can perform bidirectional printing in which printing is performed while making the head unit 24 perform scanning in the forward direction, which is the +X direction, and making the head unit 24 perform scanning in the backward direction, which is the −X direction.

=Test Pattern=

Figure 12A:
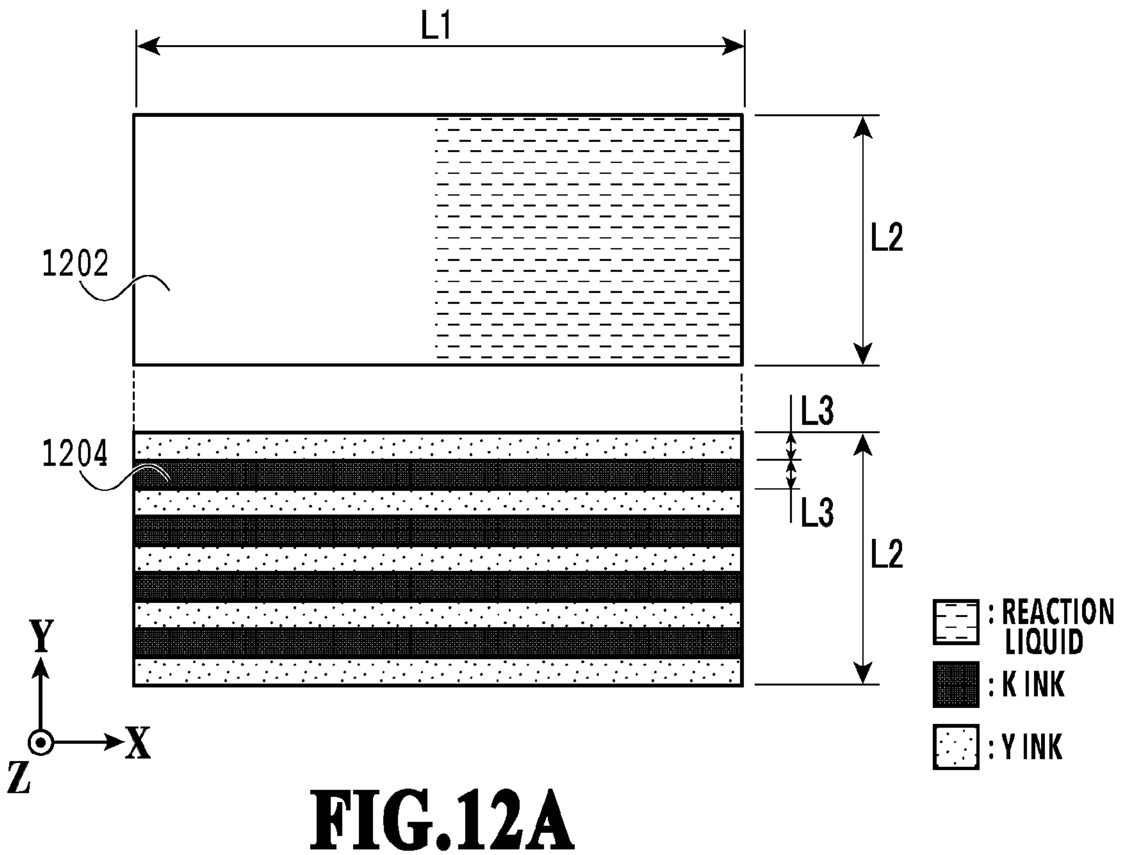
FIG. 12A and FIG. 12B are diagrams illustrating a configuration pattern of two detection patterns used in another embodiment.
Figure 12B:
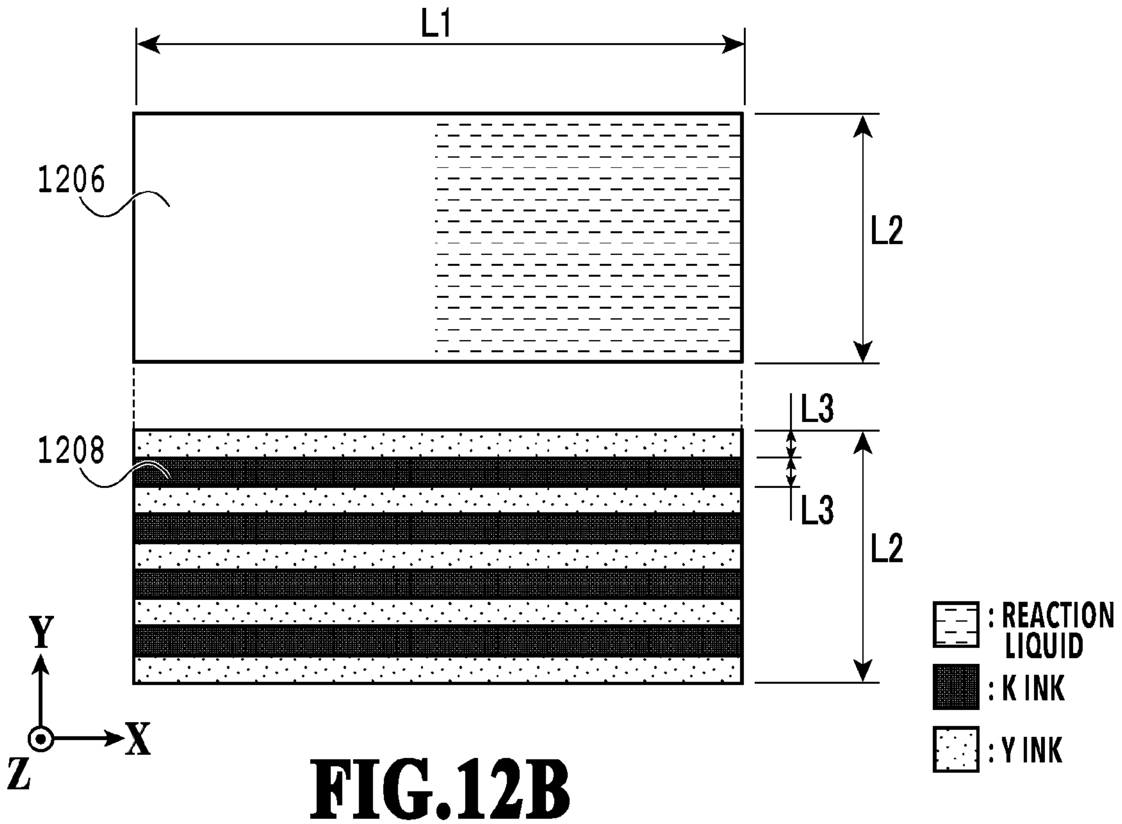

First, the test pattern 60 used for the obtainment processing executed by the printing apparatus 10 according to the present embodiment will be explained. FIG. 12A is a diagram illustrating a configuration pattern of the first detection pattern of the test pattern, and FIG. 12B is a diagram illustrating a configuration pattern of the second detection pattern of the test pattern.

In the present embodiment, the first detection pattern 62 of the test pattern 60 is a pattern for obtaining the ejection position of the reaction liquid in the forward direction, and the second detection pattern 64 of the test pattern 60 is a pattern for obtaining the ejection position of the reaction liquid in the backward direction. The first detection pattern 62 is printed by one scanning of the head unit 24 in the forward direction. That is, the first detection pattern 62 is formed by ejecting the inks and the reaction liquid in one scanning of the head unit 24 in the forward direction. The second detection pattern 64 is printed by two times of scanning of the head unit 24 in the backward direction and the forward direction. That is, the second detection pattern 64 is formed by ejecting the reaction liquid in scanning of the head unit 24 in the backward direction and then ejecting ink in scanning of the head unit 24 in the forward direction.

The first detection pattern 62 is configured with the fifth pattern 1202 for ejecting the reaction liquid and the sixth pattern 1204 for ejecting the K ink and Y ink. The second detection pattern 64 is configured with the seventh pattern 1206 for ejecting the reaction liquid and the eighth pattern 1208 for ejecting the K ink and Y ink. Each of the fifth pattern 1202 and the seventh pattern 1206 is the same as the third pattern 76 of the above-described first embodiment. Further, each of the sixth pattern 1204 and the eighth pattern 1208 is the same as the fourth pattern 78 of the above-described first embodiment. Therefore, detailed explanations of the configurations of the fifth pattern 1202, the sixth pattern 1204, the seventh pattern 1206, and the eighth pattern 1208 will be omitted.

Note that the ejection port 32 located at the most upstream in the +Y direction among the 180 ejection ports 32 used for printing the fifth pattern 1202 and the ejection port 32 located at the most downstream in the +Y direction among the 180 ejection ports 32 used for printing the seventh pattern 1206 are distant from each other by 180 ejection ports. Further, the ejection port 32 located at the most upstream in the +Y direction among the 180 ejection ports 32 used for printing the sixth pattern 1204 and the ejection port 32 located at the most downstream in the +Y direction among the 180 ejection ports 32 used for printing the eighth pattern 1208 are distant from each other by 180 ejection ports. Further, the 180 ejection ports 32 used for printing the fifth pattern 1202 and the sixth pattern 1204 can eject the inks or the reaction liquid to the same area during the same scanning. Similarly, the 180 ejection ports 32 used for printing the seventh pattern 1206 and the eighth pattern 1208 can also eject the inks or the reaction liquid to the same area during the same scanning.

=Obtainment Processing=

Figure 13:
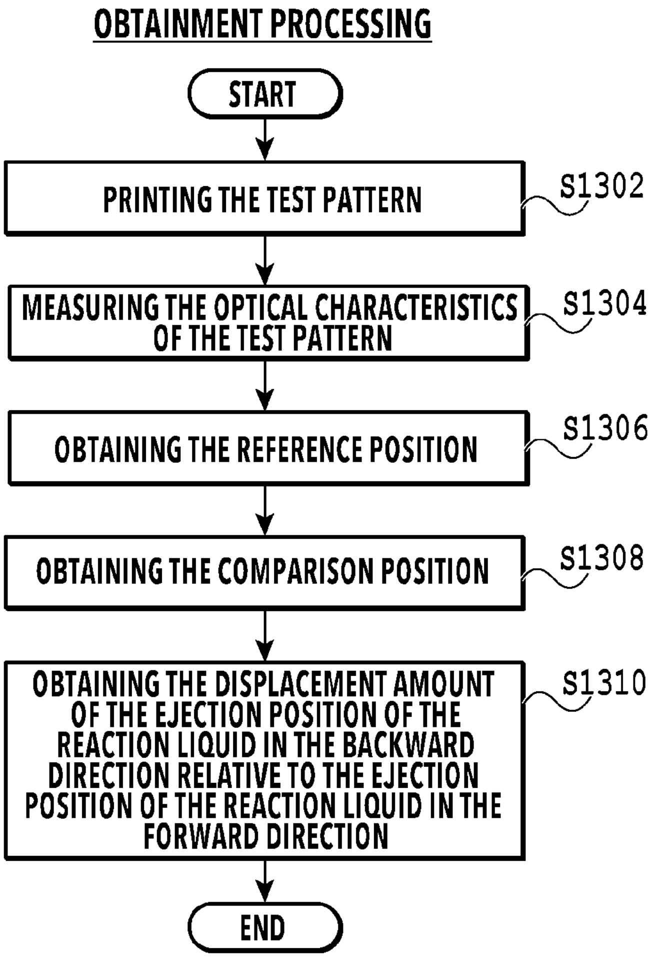
FIG. 13 is a flowchart of the obtainment processing to be executed by the printing apparatus according to another embodiment.
Figure 14A:
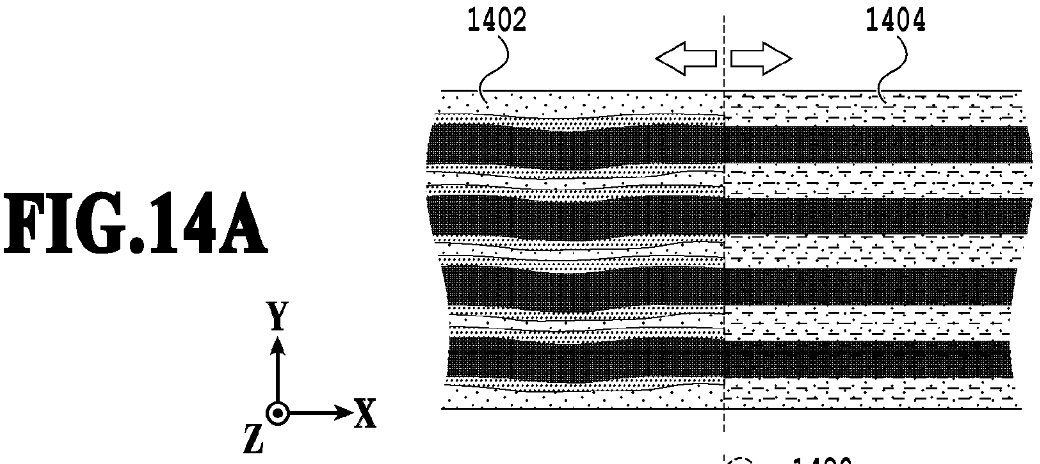
FIG. 14A to FIG. 14D are diagrams for explaining a method of obtaining optical characteristics of two detection patterns.
Figure 14B:
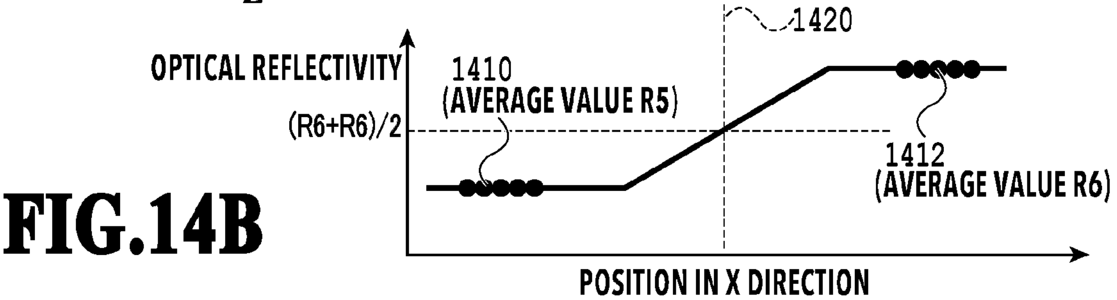
Figure 14C:
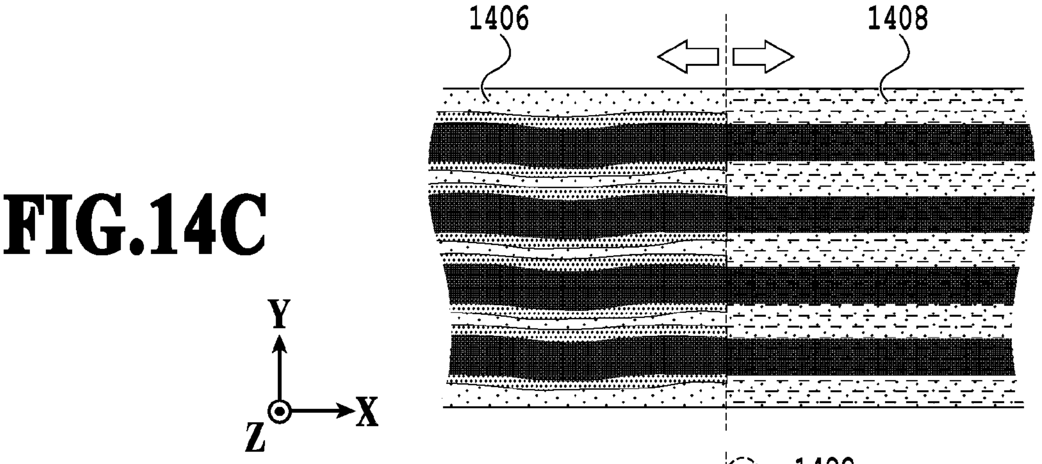
Figure 14D:
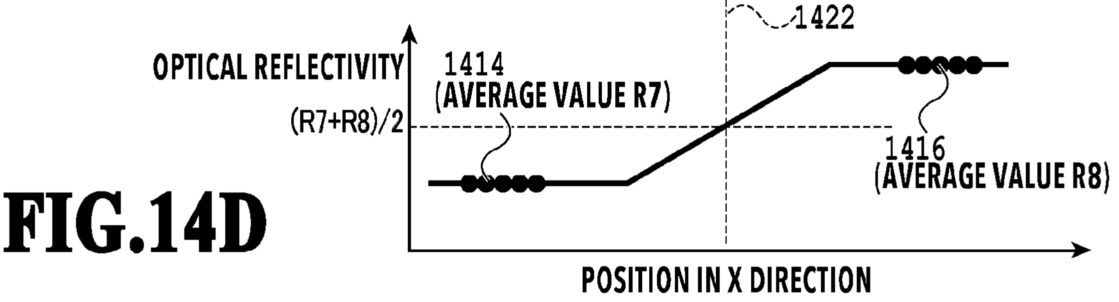

If the adjustment switch 520 is operated, the printing apparatus 10 performs the obtainment processing for obtaining the displacement amount of the ejection position of the reaction liquid in the backward direction relative to the ejection position of the reaction liquid in the forward direction. FIG. 13 is a flowchart illustrating the detailed processing routine of the obtainment processing executed by the printing apparatus according to the present embodiment. FIG. 14A is a diagram illustrating the printed first detection pattern, and FIG. 14B is a diagram illustrating the changes in the optical characteristics of the first detection pattern in the X direction. FIG. 14C is a diagram illustrating the printed second detection pattern, and FIG. 14D is a diagram illustrating the changes in the optical characteristics of the second detection pattern in the X direction.

The series of the processes illustrated in the flowchart of FIG. 13 is performed by the CPU 502 expanding a program code stored in the ROM 504 into the RAM 506 and executing the program code. Alternatively, a part or all of the functions in the steps of FIG. 13 may be executed by hardware such as an ASIC or an electronic circuit. Note that the sign "S" in the explanation of each process means that it is a step of the flowcharts.

If the obtainment processing is started, the CPU 502 first prints the test pattern 60 on the print medium (51302). In 51302, first, while making the head unit 24 perform scanning in the forward direction from the printing start position, the reaction liquid is ejected according to the fifth pattern 1202, and the K ink and Y ink are ejected according to the sixth pattern 1204. That is, the reaction liquid is ejected to the half area on the downstream side of the +X direction in the first detection pattern 62, and the K ink and Y ink are ejected to the entire area of the first detection pattern 62. Therefore, the area 1402 in which the reaction liquid is not ejected and the K ink and Y ink are ejected is formed in the half on the upstream side of the +X direction in the first detection pattern 62. Further, the area 1404 in which the reaction liquid and the K ink and Y ink are ejected is formed in the remaining half of the first detection pattern 62 (see FIG. 14A). In the printed first detection pattern 62, the bleeding areas 806 occur at the boundary between the printing areas 802 with the Y ink and the printing areas 804 with the K ink in the area 1402 where the reaction liquid is not ejected. On the other hand, bleeding areas 806 do not occur in the area 1404 where the reaction liquid is ejected.

Next, while making the head unit 24 perform scanning in the backward direction from the position where the printing of the first detection pattern 62 is completed, the reaction liquid is ejected according to the seventh pattern 1206. Thereafter, the K ink and Y ink are ejected according to the eighth pattern 1208 while making the head unit 24 perform scanning in the forward direction from the position where the printing of the seventh pattern 1206 is completed, i.e., the printing start position. That is, the reaction liquid is ejected to the half area on the downstream side of the +X direction in the second detection pattern 64, and the K ink and Y ink are ejected to the entire area of the second detection pattern 64. Therefore, the area 1406 in which the reaction liquid is not ejected and the K ink and Y ink are ejected is formed in the half on the upstream side of the +X direction in the second detection pattern 64. Further, the area 1408 in which the reaction liquid and the K ink and Y ink are ejected is formed in the remaining half of the second detection pattern 64 (see FIG. 14C). In the printed second detection pattern 64, the bleeding areas 806 occur at the boundary between the printing areas 802 with the Y ink and the printing areas 804 with the K ink in the area 1406 where the reaction liquid is not ejected. On the other hand, bleeding areas 806 do not occur in the area 1408 where the reaction liquid is ejected.

After the printing of the test pattern 60, the CPU 502 then measures the optical properties of the printed test pattern 60 (S1304). Since the specific details of processing of S1304 are the same as those of S904 described above, the detailed explanations thereof will be omitted. Then, after the measurement of the optical characteristics of the test pattern 60, the CPU 502 then obtains the reference position corresponding to the ejection position of the reaction liquid in the forward direction, which is to be the reference (S1306).

In the present embodiment, the reaction liquid is ejected to the half area on the downstream side of the +X direction of the first detection pattern 62 in the X direction while scanning in the forward direction, and, further, the K ink and Y ink are ejected to the entire area of the first detection pattern 62 in the X direction. Thus, if the ejection position of the reaction liquid in the forward direction is displaced, the boundary between the area 1402 and the area 1404 is also displaced in the X direction according to the displacement. Therefore, in S1306, the boundary between the area 1402 and the area 1404 is obtained as the reference position, based on the optical characteristics of the first detection pattern 62.

The measurement result of the first detection pattern 62 in S1304 is as illustrated in FIG. 14B. That is, in the area 1402 where the reaction liquid is not ejected and the pattern is formed with the K ink and Y ink, the bleeding areas 806 occur at the boundary between the printing areas 802 with the Y ink and the printing areas 804 with the K ink, so that the characteristics of the K ink are strongly exhibited and the optical reflectivity is low. Then, as the overlap of the detection spot 310 with the area 1404 increases due to the movement of the head unit 24 in the +X direction, the optical reflectivity increases due to the influence of the area 1404. Further, if the entire detection spot 310 enters the area 1404 due to the further movement of the head unit 24 in the +X direction, the bleeding areas 806 disappear and the characteristics of the Y ink appear, so that the optical reflectivity becomes constant at a high value. Therefore, it can be seen that the boundary between the area 1402 and the area 1404 has optical reflectivity of the intermediate value between the optical reflectivity at the time where the entire detection spot 310 is located in the area 1402 and the optical reflectivity at the time where the entire detection spot 310 is located in the area 1404.

Therefore, in S1306, first, the optical reflectivity of the measurement positions 1410 which are set in advance on the area 1402 side are obtained, and the average value R5 of the obtained optical reflectivity is obtained. It is assumed that the measurement positions 1410 are the central positions in the X direction in the area 1402, and, specifically, the five points in the vicinity of 270 dot/1200 dpi, for example. Next, the optical reflectivity of the measurement positions 1412 which are set in advance on the area 1404 side is obtained, and the average value R6 of the obtained optical reflectivity is obtained. It is assumed that the measurement positions 1412 are the central positions of the obtained optical reflectivity in the X direction, and, specifically, the five points in the vicinity of 810 dot/1200 dpi, for example. The optical reflectivity of each measurement position is based on the measurement result in S1304 which is stored in a storage area such as the memory 508.

Thereafter, the intermediate value between the average value R5 and the average value R6 is obtained, and the position corresponding to the obtained intermediate value is obtained as the reference position 1420. In the storage area such as the memory 508, the measurement positions and the optical reflectivity in the first detection pattern 62 measured in S1304 are stored in association with each other. Therefore, with reference to the information stored in the storage area, the measurement position in which the optical reflectivity matches or is the closest to (R5+R6)/2 is obtained as the reference position 1420. Note that the measurement positions 1410 and 1412 are not limited to the five points and may be one to four points or six points or more. Further, the measurement positions 1410 may be any positions as long as the detection spot 310 is located only in the area 1402, and the measurement positions 1412 may be any positions as long as the detection spot 310 is located only in the area 1404.

The CPU 502 then obtains the comparison position corresponding to the ejection position of the reaction liquid in the backward direction, which is to be compared with the reference position obtained in S1306 (S1308). In the present embodiment, the reaction liquid is ejected to the half area on the downstream side of the +X direction of the second detection pattern 64 in the X direction while scanning in the backward direction, and, further, the K ink and Y ink are ejected to the entire area of the second detection pattern 64 in the X direction while scanning in the forward direction. Thus, if the ejection position of the reaction liquid in the backward direction is displaced, the boundary between the area 1406 and the area 1408 is also displaced in the X direction according to the displacement. Therefore, in S1308, the boundary between the area 1406 and the area 1408 is obtained as the comparison position, based on the optical characteristics of the second detection pattern 64.

The measurement result of the second detection pattern 64 in S1304 is as illustrated in FIG. 14D. That is, in the area 1406 where the reaction liquid is not ejected and the pattern is formed with the K ink and Y ink, the bleeding areas 806 occur at the boundary between the printing area 802 with the Y ink and the printing area 804 with the K ink, so that the characteristics of the K ink are strongly exhibited and the optical reflectivity is low. Then, as the overlap of the detection spot 310 with the area 1408 increases due to the movement of the head unit 24 in the +X direction, the optical reflectivity increases due to the influence of the area 1408. Further, if the entire detection spot 310 enters the area 1408 due to the further movement of the head unit 24 in the +X direction, the bleeding areas 806 disappear and the characteristics of the Y ink appear, so that the optical reflectivity becomes constant at a high value. Therefore, it can be seen that the boundary between the area 1406 and the area 1408 has optical reflectivity of the intermediate value between the optical reflectivity at the time where the entire detection spot 310 is located in the area 1406 and the optical reflectivity at the time where the entire detection spot 310 is located in the area 1408.

Therefore, in S1308, first, the optical reflectivity of the measurement positions 1414 which are set in advance on the area 1406 side are obtained, and the average value R7 of the obtained optical reflectivity is obtained. It is assumed that the measurement positions 1414 are the central positions in the X direction in the area 1406, and, specifically, the five points in the vicinity of 270 dot/1200 dpi, for example. Next, the optical reflectivity of the measurement positions 1416 which are set in advance on the area 1408 side is obtained, and the average value R8 of the obtained optical reflectivity is obtained. It is assumed that the measurement positions 1416 are the central positions of the obtained optical reflectivity in the X direction, and, specifically, the five points in the vicinity of 810 dot/1200 dpi, for example. The optical reflectivity of each measurement value is based on the measurement result in S1304 which is stored in a storage area such as the memory 508.

Thereafter, the intermediate value between the average value R7 and the average value R8 is obtained, and the position corresponding to the obtained intermediate value is obtained as the comparison position 1422. In the storage area such as the memory 508, the measurement positions and the optical reflectivity of the second detection pattern 64 measured in S1304 are stored in association with each other. Therefore, with reference to the information stored in the storage area, the measurement position in which the optical reflectivity matches or is the closest to (R7+R8)/2 is obtained as the comparison position 1422. Note that the measurement positions 1414 and 1416 are not limited to the five points and may be one to four points or six points or more. Further, the measurement positions 1414 may be any positions as long as the detection spot 310 is located only in the area 1406, and the measurement positions 1416 may be any positions as long as the detection spot 310 is located only in the area 1408.

After the obtainment of the comparison position 1422, the CPU 502 then obtains the displacement amount of the ejection position of the reaction liquid in the backward direction relative to the ejection position of the reaction liquid in the forward direction, based on the reference position 1420 and the comparison position 1422 (S1310), and ends this obtainment processing. In S1310, the difference between the encoder signal value representing the reference position 1420 and the encoder signal value representing the comparison position 1422 is obtained, and the obtained difference is used as the displacement amount of the ejection position of the reaction liquid in the backward direction relative to the ejection position of the reaction liquid in the forward direction.

If the displacement amount of the ejection position of the reaction liquid is obtained in the obtainment processing, the control part 100 will calculate a correction value for correcting the ejection timing of the reaction liquid in the backward direction so that the ejection position of the reaction liquid in the backward direction matches the ejection position of the reaction liquid in the forward direction, based on the displacement amount. Then, in the print processing for performing printing on the print medium, the control part 100 performs printing with correction of the timing of ejecting the reaction liquid with the head unit 24 by use of the calculated correction value. Note that, although the ejection position of the reaction liquid in the backward direction is corrected based on the obtained displacement amount in the above-described explanation, there is not a limitation as such. That is, the ejection position of the reaction liquid in the forward direction may be corrected, or both the ejection positions of the reaction liquid in the forward direction and the backward direction may be corrected.

As explained above, in the printing apparatus 10 according to the second embodiment, both the first detection pattern 62 and the second detection pattern 64 are patterns for ejecting the reaction liquid to the half area on the downstream side of the +X direction and ejecting the K ink and Y ink to the entire area of the +X direction. Further, in the first detection pattern 62, the reaction liquid is ejected while scanning in the forward direction, and, in the second detection pattern 64, the reaction liquid is ejected while scanning in the backward direction. Thereafter, the reference position 1420 representing the ejection position of the reaction liquid in the forward direction is obtained, based on the optical characteristics of the first detection pattern 62, and the comparison position 1422 representing the ejection position of the reaction liquid in the backward direction is obtained, based on the optical characteristics of the second detection pattern 64. Then, based on the reference position 1420 and the comparison position 1422, the displacement amount of the ejection position of the reaction liquid in the backward direction relative to the ejection position of the reaction liquid in the forward direction is obtained.

Accordingly, even if the ejection head 42 for ejecting the inks and the ejection head 44 for ejecting the reaction liquid are configured separately, the displacement amount of the ejection position of the reaction liquid can be obtained by use of the test pattern 60. That is, regardless of the configuration of the ejection head, the displacement amount of the ejection position of the reaction liquid in the backward direction relative to the ejection position of the reaction liquid in the forward direction can be obtained by use of the test pattern 60.

Third Embodiment

Next, with reference to FIG. 15 to FIG. 18B, an explanation will be given of a printing apparatus according to the third embodiment. In the following explanation, the same or corresponding configurations as those of the printing apparatus according to the first embodiment described above are assigned with the same signs as those used in the first embodiment, so as to omit detailed explanations thereof.

The third embodiment is different from the above-described first embodiment in the aspect of obtaining the displacement amount of the ejection position of the reaction liquid relative to the ejection position of the inks in the direction intersecting the scanning direction at the time of ejecting the inks and the reaction liquid. Therefore, in the present embodiment, the "displacement amount of the ejection position of the reaction liquid" indicates "the displacement amount of the ejection position of the reaction liquid relative to the ejection position of the inks in the Y direction". Further, the obtainment processing executed by the printing apparatus 10 according to the present embodiment is processing of obtaining the displacement amount of the ejection position of the reaction liquid relative to the ejection position of the inks in the Y direction.

The printing apparatus 10 according to the present embodiment has a configuration in which the conveyance roller 23 is equipped with a rotary encoder (not illustrated in the drawings) so that the conveyance amount of the print medium can be obtained according to the encoder signal value that is output from this rotary encoder. That is, the printing apparatus 10 has a configuration in which position information in the Y direction can be obtained based on this encoder signal value.

=Test Pattern=

Figure 15:
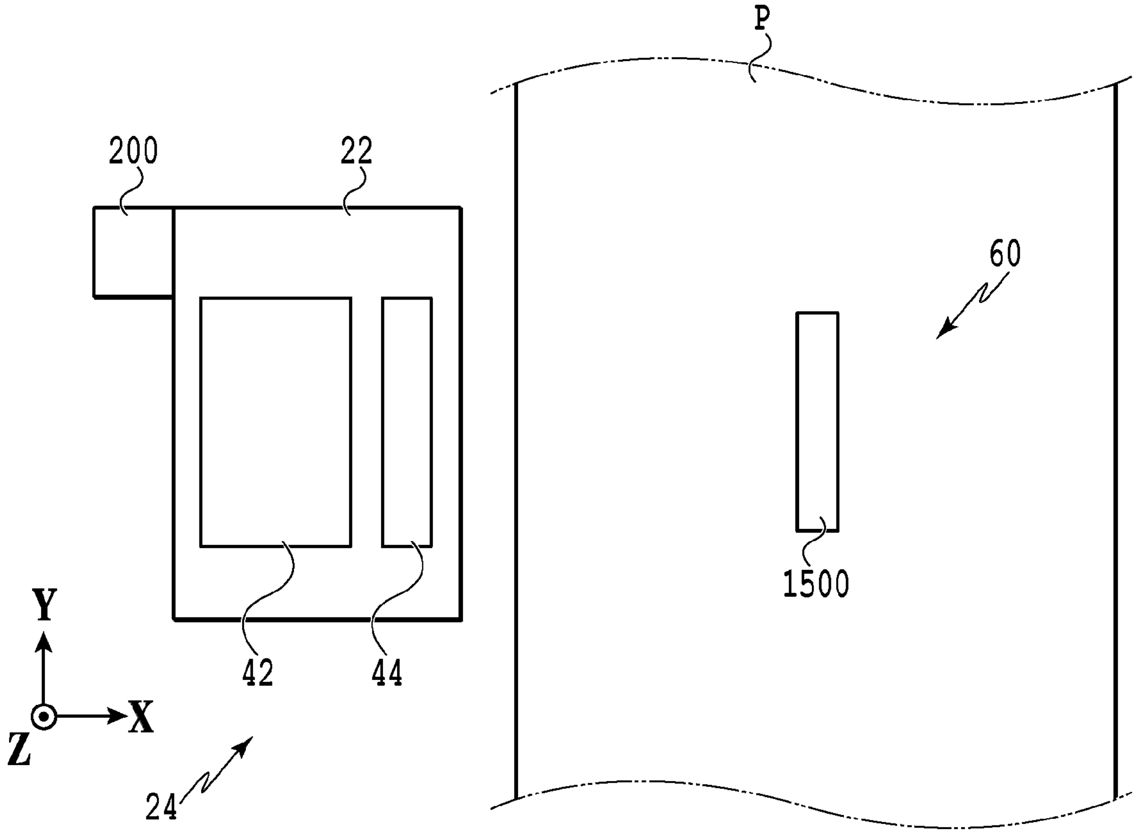
FIG. 15 is a schematic diagram of a test pattern used in another embodiment.
Figure 16A:
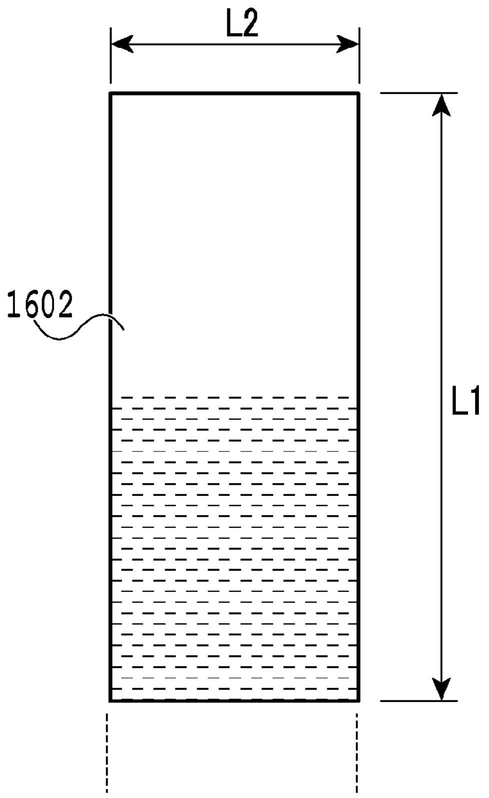
FIG. 16A to FIG. 16B are diagrams illustrating a configuration pattern of detection patterns used in another embodiment.
Figure 16B:
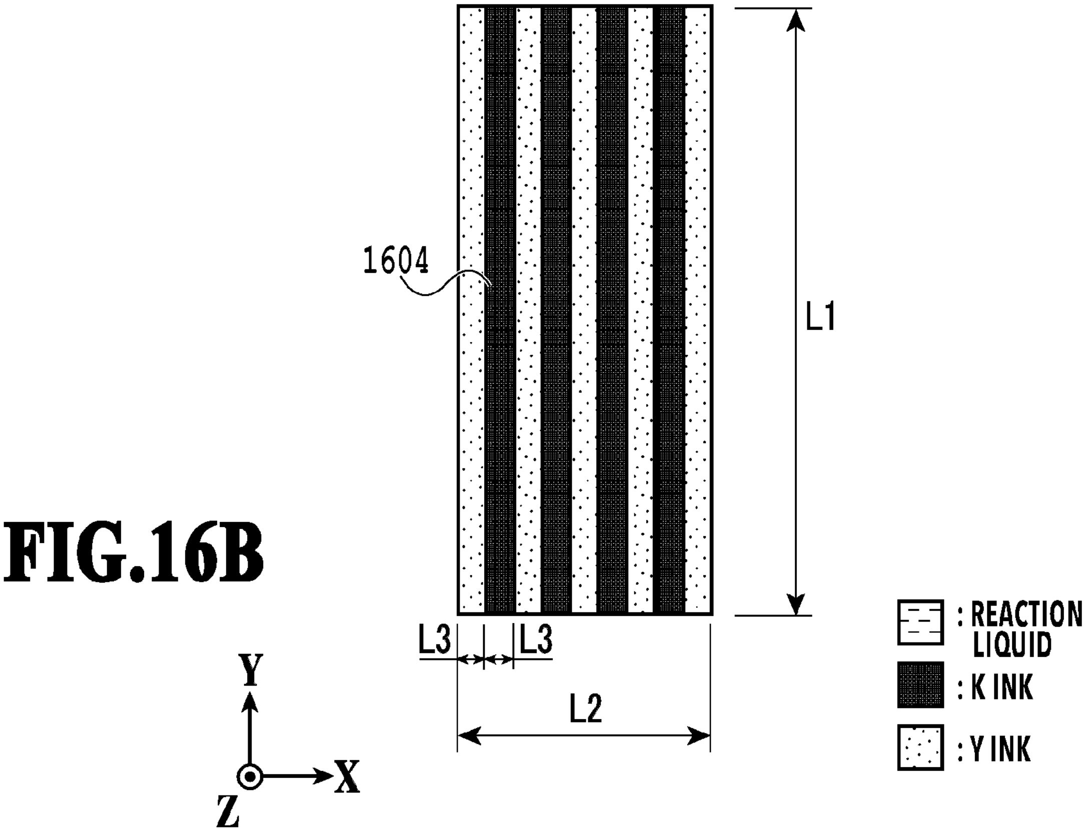

First, the test pattern 60 used for the obtainment processing executed by the printing apparatus 10 according to the present embodiment will be explained. In FIG. 15, the test pattern used for the obtainment processing, which is executed by the printing apparatus 10 according to the present embodiment, is illustrated, and FIG. 15 is illustrated so as to correspond to the head unit that ejects ink and the reaction liquid. FIG. 16A and FIG. 16B are diagrams illustrating a configuration pattern of detection patterns configuring the test pattern 60.

In the present embodiment, the test pattern 60 includes the detection pattern 1500 for detecting the ejection position of the reaction liquid in the Y direction (see FIG. 15). That is, the detection pattern 1500 is a pattern for obtaining the displacement amount of the ejection position of the reaction liquid relative to the ejection position of the inks, which is to be the reference, in the Y direction.

The test pattern 60 is printed by one scanning of the head unit 24 in the +X direction. The detection pattern 1500 is a pattern in which the second detection pattern 64 of the first embodiment is rotated clockwise by 90 degrees. Therefore, in the present embodiment, the detection pattern 1500 will be printed in the area of 1 dot/1200 dpi to 1080 dot/1200 dpi in the Y direction and 1 dot/1200 dpi to 180 dot/1200 dpi in the X direction.

The detection pattern 1500 is configured with the ninth pattern 1602 for ejecting the reaction liquid and the tenth pattern 1604 for ejecting the K ink and Y ink (see FIG. 16A and FIG. 16B). The ninth pattern 1602 and the tenth pattern 1604 each have the length L2 in the X direction and the length L1 in the Y direction. The length L1 is the length of printing 1080 dots at a resolution of 1200 dpi, and the length L2 is the length of printing 180 dots at a resolution of 1200 dpi.

In the ninth pattern 1602, a non-ejection area where the reaction liquid is not ejected is formed in the half thereof located on the downstream side of the +Y direction, and an ejection area where the reaction liquid is ejected is formed in the half thereof located on the upstream side of the +Y direction. That is, the ninth pattern 1602 is a pattern in which the reaction liquid is ejected at a resolution of 1200 dpi to the half area on the upstream side of the +Y direction. Therefore, in the ninth pattern 1602, the reaction liquid is ejected by the 540 ejection ports 32 existing on the upstream side of the +Y direction in the ejection port array 46RCT such that printing is performed at a resolution of 1200 dpi. That is, the ninth pattern 1602 is printed by use of 540 ejection ports 32 on the upstream side of the +Y direction among the 1080 ejection ports 32 in the ejection port array 46RCT.

The tenth pattern 1604 is a pattern in which printing is alternately performed in the X direction so that the printing areas of the K ink and the printing areas of the Y ink are adjacent to each other in the entire area. Both K ink and Y ink are printed at a resolution of 1200 dpi in each printing area. The length L3 of the printing areas with the K ink and the printing areas with the Y ink in the X direction has a smaller value than the half of the length L2, so that multiple printing areas are each formed in the tenth pattern 1604. In the present embodiment, it is assumed that the length L3 is the length corresponding to 20 dots at a resolution of 1200 dpi. Therefore, in the tenth pattern 1604 of the present embodiment, the five printing areas with the Y ink and the four printing areas with the K ink are formed. In the tenth pattern 1604, the K ink is ejected by all the ejection ports 32 in the ejection port array 46K such that printing is performed at a resolution of 1200 dpi, and the Y ink is ejected by all the ejection ports 32 in the ejection port array 46Y such that printing is performed at a resolution of 1200 dpi.

=Obtainment Processing=

Figure 17:
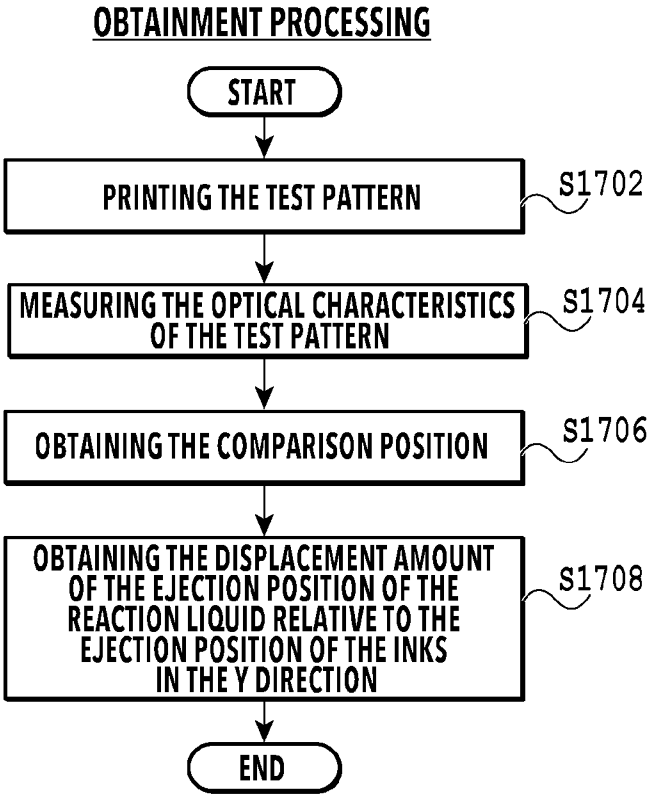
FIG. 17 is a flowchart of the obtainment processing to be executed by the printing apparatus according to another embodiment.
Figure 18B:
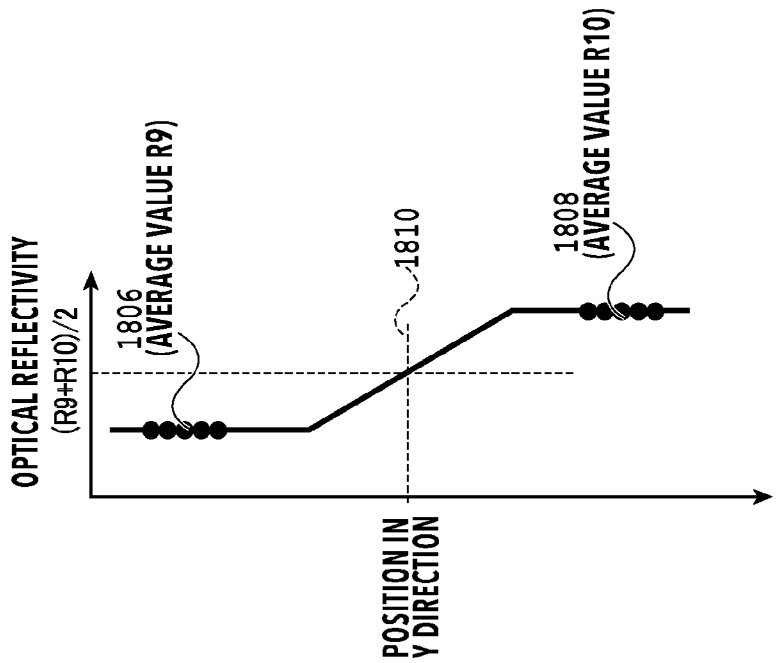
FIG. 18A and FIG. 18B are diagrams illustrating a method of obtaining optical characteristics of a detection pattern.
Figure 18A:
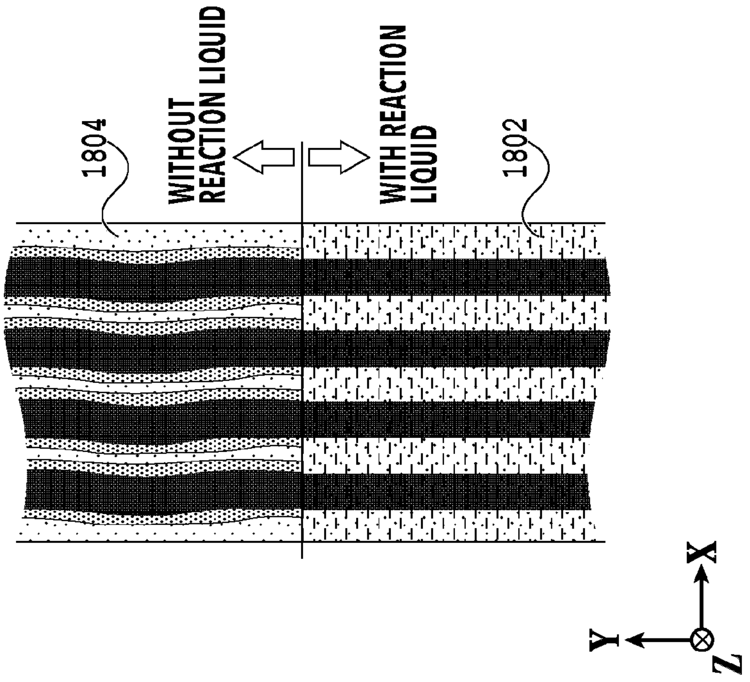

If the adjustment switch 520 is operated, the printing apparatus 10 performs the obtainment processing for obtaining the displacement amount of the ejection position of the reaction liquid relative to the ejection position of the inks in the Y direction. FIG. 17 is a flowchart illustrating the detailed processing routine of the obtainment processing executed by the printing apparatus according to the present embodiment. FIG. 18A is a diagram illustrating the printed detection pattern, and FIG. 18B is a diagram illustrating the change in the optical characteristics of the detection pattern of FIG. 18A in the Y direction.

The series of the processes illustrated in the flowchart of FIG. 17 is performed by the CPU 502 expanding a program code stored in the ROM 504 into the RAM 506 and executing the program code. Alternatively, a part or all of the functions in the steps of FIG. 17 may be executed by hardware such as an ASIC or an electronic circuit. Note that the sign "S" in the explanation of each process means that it is a step of the flowcharts.

If the obtainment processing is started, the CPU 502 first prints the test pattern 60 on the print medium (S1702). As patterns for forming the test pattern 60, the memory 508 stores the patterns enabling printing of the detection pattern 1500 with one scanning performed by the head unit 24 in the +X direction. In S1702, these patterns are used to print the test pattern 60 (detection pattern 1500) with the reaction liquid and the K ink and Y ink during one scanning performed by the head unit 24 in the +X direction.

As illustrated in FIG. 18A, in the printed detection pattern 1500, the K ink and Y ink are ejected together with the reaction liquid to the half area 1802 on the upstream side of the +Y direction. Further, the K ink and Y ink are ejected to the half area 1804 on the downstream side of the +Y direction. As illustrated in FIG. 4, in the head unit 24, the ejection port array 46RCT is located on the downstream side of the +X direction relative to the ejection port array 46K and the ejection port array 46Y. Therefore, in the detection pattern 1500 which is printed with one scanning in the +X direction, the reaction liquid is ejected and then the K ink and Y ink are ejected in the area 1802. Further, in the area 1804, the reaction liquid is not ejected and the K ink and Y ink are ejected. Therefore, in the area 1804, the bleeding areas occur at the boundary between the printing areas with the Y ink and the printing areas with the K ink, and, in the area 1802, bleeding areas do not occur at the boundary. Further, due to the presence of the reaction liquid, no bleeding occurs at the boundary between the area 1802 and the area 1804 as well.

After the printing of the test pattern 60, the CPU 502 then measures the optical characteristics of the printed test pattern 60 (S1704). That is, in S1704, the optical characteristics of the detection pattern 1500 are measured, and the change in the optical characteristics in the Y direction is obtained. Specifically, first, the head unit 24 is moved to the position where the center of the detection spot 310 of the optical sensor 200 overlaps the center of the detection pattern 1500 in the Y direction. Further, the print medium P is conveyed to the position where the detection spot 310 overlaps the end part of the detection pattern 1500 on the downstream side of the +Y direction. Thereafter, while conveying the print medium P in the −Y direction, the optical characteristics (optical reflectivity) of the areas 1802 and 1804 are measured by the optical sensor 200 at an interval of 2400 dpi, for example. Note that the measurement result is stored in a storage area together with the measurement position. The position information at this time is an encoder signal value of the rotary encoder installed on the conveyance roller 23.

After the measurement of the optical characteristics of the test pattern 60, the CPU 502 then obtains the comparison position corresponding to the ejection position of the reaction liquid, which is to be compared with the reference position (S1706). In the present embodiment, while scanning in the +X direction, the reaction liquid is ejected to the half area on the upstream side of the +Y direction in the detection pattern 1500, and, further, the K ink and Y ink are ejected to the entire area of the detection pattern 1500. Thus, if the ejection position of the reaction liquid is displaced in the Y direction, the boundary between the area 1802 and the area 1804 is also displaced in the Y direction according to the displacement. Therefore, in S1706, the boundary between the area 1802 and the area 1804 is obtained as the comparison position, based on the optical characteristics of the detection pattern 1500.

The measurement result of the detection pattern 1500 in S1704 is as illustrated in FIG. 18B. That is, in the area 1804 where the reaction liquid is not ejected and the pattern is formed with the K ink and Y ink, the bleeding areas occur at the boundary between the printing areas with the Y ink and the printing areas with the K ink, so that the characteristics of the K ink are strongly exhibited and the optical reflectivity is low. Then, as the overlap of the detection spot 310 with the area 1802 increases due to the movement of the print medium P in the −Y direction, the optical reflectivity increases due to the influence of the area 1802. Further, if the entire detection spot 310 enters the area 1802 due to the further movement of the print medium P in the −Y direction, the above-described bleeding areas disappear and the characteristics of the Y ink appear, so that the optical reflectivity becomes constant at a high value. Therefore, it can be seen that the boundary between the area 1802 and the area 1804 has optical reflectivity of the intermediate value between the optical reflectivity at the time where the entire detection spot 310 is located in the area 1802 and the optical reflectivity at the time where the entire detection spot 310 is located in the area 1804.

Therefore, in S1706, first, the optical reflectivity of the measurement positions 1806 which are set in advance on the area 1804 side are obtained, and the average value R9 of the obtained optical reflectivity is obtained. It is assumed that the measurement positions 1806 are the five points in the vicinity of the central positions in the Y direction in the area 1804, for example. Next, the optical reflectivity of the measurement positions 1808 which are set in advance on the area 1802 side is obtained, and the average value R10 of the obtained optical reflectivity is obtained. It is assumed that the measurement positions 1808 are the five points in the vicinity of the central positions in the Y direction in the area 1802. The optical reflectivity of each measurement position is based on the measurement result in S1704 which is stored in a storage area such as the memory 508.

Thereafter, the intermediate value between the average value R9 and the average value R10 is obtained, and the position corresponding to the obtained intermediate value is obtained as the comparison position 1810. In the storage area such as the memory 508, the measurement positions and the optical reflectivity of the detection pattern 1500 measured in S1704 are stored in association with each other. Therefore, with reference to the information stored in the storage area, the measurement position in which the optical reflectivity matches or is the closest to (R9+R10)/2 is obtained as the comparison position 1810. Note that the measurement positions 1806 and 1808 are not limited to the five points and may be one to four points or six points or more. Further, the measurement positions 1806 may be any positions as long as the detection spot 310 is located only in the area 1804, and the measurement positions 1808 may be any positions as long as the detection spot 310 is located only in the area 1802.

After the obtainment of the comparison position, the CPU 502 then obtains the displacement amount of the ejection position of the reaction liquid relative to the ejection position of the inks in the Y direction, based on the preset reference position and the comparison position 1810 (S1708), and ends this obtainment processing. In the present embodiment, the encoder signal of the rotary encoder installed on the conveyance roller 23 and the position of each ejection port 32 of the ejection port arrays 46 extending in the Y direction are synchronized in advance. Therefore, the encoder signal value corresponding to the ejection port 32 at the center position (541 dot/1200 dpi in the present embodiment) of the detection pattern 1500 in the Y direction is set as the reference position. Therefore, in S1708, the difference between the encoder signal value representing the preset reference position and the encoder signal value representing the comparison position 1810 is obtained as the displacement amount of the ejection position of the reaction liquid in the Y direction.

If the displacement amount of the ejection position of the reaction liquid is obtained in the obtainment processing, the control part 100 will correct the positions of the ejection ports that eject the reaction liquid, based on the displacement amount, so that the ejection position of the reaction liquid matches the ejection position of the inks. Further, the control part 100 will perform printing while correcting the ejection ports that eject the reaction liquid during the print processing for printing on the print medium.

As explained above, in order to obtain the displacement amount of the ejection position of the reaction liquid relative to the ejection position of the inks in the Y direction, the printing apparatus 10 according to the third embodiment prints the test pattern 60 configured with the detection pattern 1500 extending in the Y direction. In the detection pattern 1500 being divided into two in the Y direction, the area 1802 where the K ink and Y ink are ejected together with the reaction liquid is formed in the half on the upstream side of the +Y direction. Further, the area 1804 where the reaction liquid is not ejected and the K ink and Y ink are ejected is formed in the half on the downstream side of the +Y direction. Further, the optical sensor 200 obtains the change in the optical reflectivity of the detection pattern 1500 in the Y direction. Further, based on this change, the comparison position 1810 which corresponds to the ejection position of the reaction liquid is obtained. Thereafter, based on the preset reference position and the comparison position 1810, the displacement amount of the ejection position of the reaction liquid relative to the ejection position of the inks in the Y direction is obtained.

Accordingly, regardless of the configuration of the ejection head, the displacement amount of the ejection position of the reaction liquid relative to the ejection position of the inks in the Y direction can be obtained by use of the test pattern 60, which is configured with the detection pattern 1500.

OTHER EMBODIMENTS

Note that the above-described embodiments may be modified as shown in the following (1) through (11).

Figure 19:
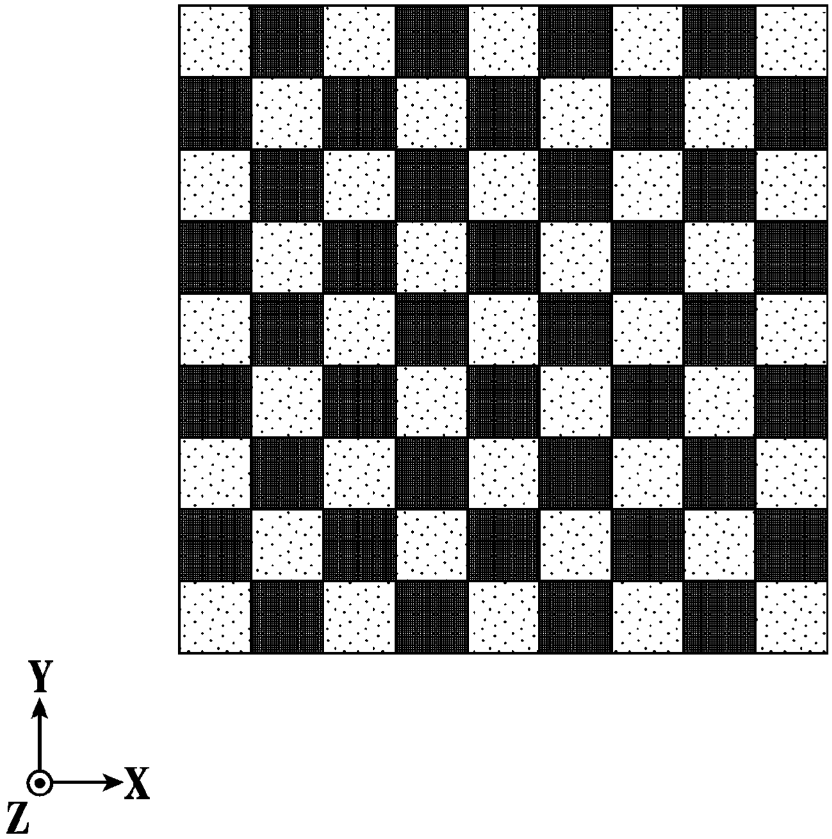
FIG. 19 is a diagram for explaining a modification example of a detection pattern.

(1) In each of the above-described embodiments, although the fourth pattern 78, the sixth pattern 1204, the eighth pattern 1208, and the tenth pattern 1604 are configured with the two colors of inks, i.e., the K ink and Y ink, there is not a limitation as such. Although various publicly-known inks can be used as the two colors of inks, it is preferable to use two colors of inks having a predetermined amount or more of difference in optical characteristics. Alternatively, it is also possible that three or more colors of inks are used. In each of the above-described embodiments, although the fourth pattern 78, the sixth pattern 1204, the eighth pattern 1208, and the tenth pattern 1604 are ruled line patterns in which the ejection areas of the two colors of inks extend in a predetermined direction and are arranged alternately in the direction intersecting the predetermined direction, there is not a limitation as such. Any geometric patterns in which different inks are adjacent to each other may be used, and, for example, as illustrated in FIG. 19, a checkerboard pattern (hounds-tooth check pattern) in which a grid of one ink and a grid of another ink are alternately arranged may be used.

(2) In the above-described first embodiment, although the reference position 1110 is obtained by using the first detection pattern 62, there is not a limitation as such. It is also possible that the position in the X direction according to the encoder signal and the landing position of the K ink are synchronized in advance so as to set the encoder signal value for ejecting the K ink at 541 dot/1200 dpi in the X direction as the reference signal. Further, although the reference position is set in advance in the above-described third embodiment, there is not a limitation as such. As in the first embodiment, it is also possible that the detection pattern for obtaining the reference position is printed so as to obtain the reference position based on the optical characteristics of the detection pattern. As the detection pattern for obtaining the reference position, a pattern in which the first detection pattern 62 of the first embodiment is rotated clockwise by 90 degrees may be used.

(3) Although not particularly described in the above embodiments, a reaction liquid containing no color material is used, but it is also possible to use a reaction liquid containing a color material as long as the image quality is not affected. Further, although not particularly described in the above embodiments, various publicly-known ink ejection method may be applied to the ejection heads 42 and 44, such as what is termed as a thermal method in which ink is ejected by use of an electro-thermal conversion element, and what is termed as a piezoelectric method in which ink is ejected by use of a piezoelectric element.

(4) In the above-described embodiments, although the control part 100 of the printing apparatus executes the obtainment processing and corrects the ejection position of the reaction liquid based on the obtained displacement amount, there is not a limitation as such. For example, it is also possible that an apparatus installed separately from the printing apparatus 10 such as the host apparatus 110 controls the printing apparatus 10 to execute the obtainment processing so that the apparatus or the control part 100 corrects the ejection position of the reaction liquid, based on the displacement amount obtained in the obtainment processing, Further, although the ejection position of the reaction liquid is corrected based on the displacement amount obtained in the obtainment processing, there is not a limitation as such, and it is also possible to correct the ejection position of ink or correct the ejection positions of ink and the reaction liquid.

(5) Although not particularly described in the above embodiments, for the fourth pattern 78, the sixth pattern 1204, the eighth pattern 1208, and the tenth pattern 1604, it is also possible to prepare multiple patterns whose lengths L3 of the printing areas of the K ink and the Y ink in the transverse direction are different. The degree of ink bleeding varies depending on the liquid absorbency of the print medium. Therefore, it is also possible to select any of the multiple prepared patterns, depending on the absorbency of the print medium. Specifically, as the bleeding is less likely to occur, that is, as the absorbability of the print medium is higher, the length L3 is set to be shorter, and, as the bleeding is more likely to occur, that is, as the absorbability of the print medium is lower, the length L3 is set to be longer. Note that, as the fourth pattern 78 or the like, in a case where the pattern of FIG. 19 is used, the size of each grid changes according to the absorbency of the print medium. Specifically, as the absorbency of the print medium is lower, the length of one side of each grid is set to be longer, and, as the absorbency of the print medium is higher, the length of one side of each grid is set to be shorter.

(6) Although not particularly described in the above-described embodiments, it is assumed that the length of the contact part between the ejection areas of the K ink and the ejection areas of the Y ink in the detection spot 310 is L/4 or more and $L^2/12$ or less if the outer periphery of the detection spot 310 is L. Note that the length of the above-described contact part is the total length of the boundary portion between the ejection areas of the K ink and the ejection areas of the Y ink located in the detection spot 310. Although not particularly described in the above embodiments, it is preferable that the color of the light source of the light-emitting part 302, which is implemented by the visible LEDs of the optical sensor 200, is such a color that the light 306 is easily absorbed with the color of the ejected ink (excluding the K ink) and has a small amount of reflected light. For example, a red visible LED is preferable for Y ink.

(7) In the above-described embodiments, although both the inks and the reaction liquid are printed at a resolution of 1200 dpi in the test pattern 60, there is not a limitation as such. Since it is sufficient as long as the reaction liquid is able to suppress the bleeding of the ink ejected on the reaction liquid, the reaction liquid may be printed at a resolution lower than the resolution of the ink, that is, with an ejection amount smaller than that of the ink, for example. Further, as for the inks, the inks may have a resolution higher than or lower than the resolution of 1200 dpi since bleeding occurs on the print medium in the absence of the reaction liquid.

(8) In the above-described embodiments, although the third pattern 76, the fifth pattern 1202, the seventh pattern 1206, and the ninth pattern 1602 are formed with the ejection area where the reaction liquid is ejected and the non-ejection area where the reaction liquid is not ejected, there is not a limitation as such. In the respective detection patterns where the above-described four patterns are used, it is sufficient as long as a density difference occurs due to bleeding between the portion where the ejection area is located and the portion where the non-ejection area is located. Therefore, it is also possible that the non-ejection areas of the above-described four patterns are low-ejection areas in which a small amount of reaction liquid is ejected to the extent that bleeding occurs between the portion where the ejection area is located and the portion where the non-ejection area is located in the detection patterns. It is assumed that the amount of reaction liquid ejected to the low-ejection areas is ¾ or less (¾ times or less) of the amount to be ejected to the ejection areas, for example. Note that the amount of reaction liquid ejected to the low-ejection areas is appropriately set according to the characteristics of the inks and the reaction liquid to be used.

(9) In the explanations of above-described first embodiment and third embodiment, what is termed as a serial-scan type printing apparatus which performs printing with a printing operation of ejecting inks and a reaction liquid while scanning in the X direction and a conveyance operation of conveying the print medium P in the Y direction is taken as an example of the printing apparatus 10. However, the printing apparatus according to the present embodiment is not limited as such. That is, it is also possible that what is termed as a full-line type printing apparatus which performs printing by ejecting inks and a reaction liquid from an ejection head, in which ejection ports are arranged across the printing area of the print medium P, to the print medium that is conveyed in the direction intersecting the arrangement direction of the ejection ports is used as the printing apparatus 10.

(10) Although not particularly described in the above-described embodiments, it is also possible that the printing apparatus 10 is configured to be capable of selectively executing the obtainment processing of each of the above-described embodiments. Although not particularly described in the above-described embodiment, various publicly-known techniques can be applied to the method of correcting the ejection position of the reaction liquid, based on the displacement amount obtained by the obtainment processing.

(11) The above-described embodiments and various forms shown in (1) through (10) may be combined as appropriate.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-109356, filed Jun. 30, 2021, which is hereby incorporated by reference wherein in its entirety.

What is claimed is:

1. A printing apparatus comprising:

a printing unit configured to perform printing by ejecting a plurality of inks, whose materials are different from each other, and a reaction liquid, which reacts with the inks so as to prompt solidification of the inks, to a print medium;

a measurement unit configured to be capable of measuring an optical characteristic of a print product;

a control unit configured to control the printing unit to use at least two inks of the plurality of inks and the reaction liquid and print a test pattern in which bleeding is made to occur between the at least two inks and configured to control the measurement unit to measure an optical characteristic of the printed test pattern; and an obtainment unit configured to obtain a displacement amount of an ejection position of the reaction liquid, based on the optical characteristic of the test pattern measured by the measurement unit, wherein the test pattern includes a detection pattern extending in a predetermined direction, and the detection pattern divided into two in the predetermined direction includes one area, in which the at least two inks and the reaction liquid are ejected, and the other area, in which only the at least two inks or the at least two inks and the reaction liquid of an amount that is smaller than that of the reaction liquid ejected to the one area are ejected, and wherein the obtainment unit obtains the displacement amount in the predetermined direction, based on an optical characteristic of the detection pattern.

2. The printing apparatus according to claim 1, wherein a plurality of ejection ports for ejecting the plurality of inks and the reaction liquid are arranged in the printing unit, and wherein the predetermined direction is a direction intersecting the arrangement direction of the ejection ports.

3. The printing apparatus according to claim 2, wherein the printing unit performs printing by ejecting the plurality of inks and the reaction liquid to the print medium while reciprocating in the predetermined direction, wherein the test pattern is configured with two of the detection patterns, and, regarding one detection pattern, in the one area, the at least two inks are ejected and the reaction liquid is ejected while moving the printing unit in a backward direction of the predetermined direction, and, in the other area, only the at least two inks are ejected, and, regarding the other detection pattern, in the one area, the at least two inks are ejected and the reaction liquid is ejected while moving the printing unit in a forward direction of the predetermined direction, and, in the other area, only the at least two inks are ejected, and wherein the obtainment unit obtains the ejection position of the reaction liquid in the backward direction based on an optical characteristic of the one detection pattern, obtains the ejection position of the reaction liquid in the forward direction based on an optical characteristic of the other detection pattern, and obtains, as the displacement amount, a displacement amount of the ejection position of the reaction liquid in the backward direction relative to the ejection position of the reaction liquid in the forward direction according to the ejection position of the reaction liquid in the backward direction relative to the ejection position of the reaction liquid in the forward direction.

4. The printing apparatus according to claim 1, wherein a plurality of ejection ports for ejecting the plurality of inks and the reaction liquid are arranged in the printing unit, and wherein the predetermined direction a direction matching the arrangement direction of the ejection ports.

5. The printing apparatus according to claim 1, wherein the obtainment unit obtains an ejection position of the reaction liquid, based on the optical characteristic of the detection pattern, and, as the displacement amount, the obtainment unit obtains a displacement amount of the ejection position of the reaction liquid relative to an ejection position of the plurality of inks in the predetermined direction according to the ejection position of the reaction liquid relative to the ejection position of the plurality of inks.

6. The printing apparatus according to claim 1, wherein the detection pattern divided into two in the predetermined direction is configured with a first pattern including an ejection area in the one area, where only the reaction liquid is ejected, and a non-ejection area in the other area, where the reaction liquid and the plurality of inks are not ejected, and a second pattern, in which an ejection area where one of the two inks of the plurality of inks is ejected and an ejection area where the other of the two inks is ejected are arranged alternately in the direction intersecting the predetermined direction in the entire area of the predetermined direction.

7. The printing apparatus according to claim 6, wherein, regarding the second pattern, the length of the ejection areas of the two inks in the direction intersecting the predetermined direction changes according to absorbency of the print medium.

8. The printing apparatus according to claim 6, wherein, if an outer periphery of a detection range of the measurement unit for detecting the optical characteristic is L, the length of a contact part between the ejection area of the one ink and the ejection area of the other ink in the detection range is L/4 or more and L2/12 or less.

9. The printing apparatus according to claim 1, wherein the detection pattern divided into two in the predetermined direction is configured with a first pattern including an ejection area in the one area, where only the reaction liquid is ejected, and a non-ejection area in the other area, where the reaction liquid and the plurality of inks are not ejected, and a second pattern, in which a checkerboard pattern is formed with a grid of one of the two inks of the plurality of inks and a grid of the other of the two inks in the entire area of the predetermined direction.

10. The printing apparatus according to claim 9, wherein, regarding the second pattern, the sizes of the grids change according to absorbency of the print medium.

11. The printing apparatus according to claim 1, wherein, based on an optical characteristic of the one area and an optical characteristic of the other area of the detection pattern, the obtainment unit obtains the boundary of the one area and the other area as the ejection position of the reaction liquid.

12. The printing apparatus according to claim 11, wherein the optical characteristic of the one area is a first optical characteristic that is measured at a measurement position in which the detection range of the measurement unit for detecting the optical characteristic is located only in the one area, and wherein the optical characteristic of the other area is a second optical characteristic that is measured at a measurement position in which the detection range is located only in the other area.

13. The printing apparatus according to claim 12, wherein each of the first optical characteristic and the second optical characteristic is an average value of optical characteristics of a plurality of measurement positions.

14. The printing apparatus according to claim 12, wherein the boundary is a position whose optical characteristic matches or is close to a value obtained by dividing the sum of the first optical characteristic and the second optical characteristic by 2.

15. The printing apparatus according to claim 1, further comprising a correction unit configured to correct at least one of an ejection position of the plurality of inks and the ejection position of the reaction liquid, based on the displacement amount.

16. The printing apparatus according to claim 1, wherein the inks used for the detection pattern include black ink.

17. The printing apparatus according to claim 1, wherein the test pattern further includes a reference pattern extending in the predetermined direction, where the reaction liquid and either one of the at least two inks are ejected to the one area of the predetermined direction and only the reaction liquid is ejected to the other area of the predetermined direction, and wherein the obtainment unit obtains an ejection position of the plurality of inks, based on an optical characteristic of the reference pattern, and obtains a displacement amount in the predetermined direction, based on the ejection position of the plurality of inks and the ejection position of the reaction liquid that are obtained.

18. The printing apparatus according to claim 1, wherein the amount of the reaction liquid ejected to the other area of the detection pattern is ¾ or less of the amount of the reaction liquid ejected to the one area.

19. A printing method of a printing apparatus that performs printing by ejecting a plurality of inks, whose materials are different from each other, and a reaction liquid, which reacts with the inks so as to prompt solidification of the inks, to a print medium, the printing method comprising;

a printing step for printing a test pattern, which includes a detection pattern extending in a predetermined direction, wherein the detection pattern divided into two in the predetermined direction includes one area, in which the at least two inks and the reaction liquid are ejected, and the other area, in which only the at least two inks or the at least two inks and the reaction liquid of an amount that is smaller than that of the reaction liquid ejected to the one area are ejected;

a measurement step for measuring an optical characteristic of the test pattern printed in the printing step;

an obtainment step for obtaining a displacement amount of an ejection position of the reaction liquid in the predetermined direction, based on the optical characteristic of the test pattern measured in the measurement step; and a printing step for performing printing with correction of the displacement amount obtained in the obtainment step.

20. A non-transitory computer readable storage medium storing a program for causing a computer to function as a control apparatus that controls a printing apparatus, the control apparatus comprising:

a printing unit configured to perform printing by ejecting a plurality of inks, which are different from each other, and a reaction liquid, which reacts with the inks so as to prompt solidification of the inks, to a print medium; and a measurement unit configured to be capable of measuring an optical characteristic of a print product, wherein the printing unit is controlled to print a test pattern, which includes a detection pattern extending in a predetermined direction, and the detection pattern divided into two in the predetermined direction includes one area, in which the at least two inks and the reaction liquid are ejected, and the other area, in which only the at least two inks or the at least two inks and the reaction liquid of an amount that is smaller than that of the reaction liquid ejected to the one area are ejected, wherein the measurement unit is controlled to measure an optical characteristic of the printed detection pattern, and wherein the displacement amount of an ejection position of the reaction liquid in the predetermined direction is obtained, based on the optical characteristic of the detection pattern.

* * * * *